United States Patent
Kamata

(10) Patent No.: US 8,913,464 B2
(45) Date of Patent: Dec. 16, 2014

(54) METHODS AND SYSTEMS FOR SEISMIC SIGNAL DETECTION

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 476 days.

(21) Appl. No.: 13/224,378

(22) Filed: Sep. 2, 2011

(65) Prior Publication Data
US 2012/0063263 A1  Mar. 15, 2012

Related U.S. Application Data
(60) Provisional application No. 61/382,916, filed on Sep. 14, 2010.

(51) Int. Cl.
*G01V 1/18* (2006.01)

(52) U.S. Cl.
CPC ...................................... *G01V 1/182* (2013.01)
USPC .......................................................... 367/182

(58) Field of Classification Search
CPC ............................... G01V 1/181; G01V 1/182
USPC .................................................. 367/182–187
See application file for complete search history.

(56) References Cited

U.S. PATENT DOCUMENTS

| | | | |
|---|---|---|---|
| 2,697,594 A | 12/1954 | Stanton | |
| 2,748,370 A | 5/1956 | Baltosser | |
| 2,995,935 A | 8/1961 | Eyestone et al. | |
| 3,702,073 A | 11/1972 | Jacobs | |
| 3,878,504 A * | 4/1975 | Sears | 367/187 |
| 4,144,765 A | 3/1979 | Aske | |
| 4,159,464 A * | 6/1979 | Hall, Jr. | 367/182 |
| 4,243,839 A * | 1/1981 | Takahashi et al. | 381/96 |
| 4,285,054 A * | 8/1981 | McNeel | 367/183 |
| 4,520,238 A * | 5/1985 | Ikeda | 381/151 |
| 4,697,455 A | 10/1987 | Norling | |
| 4,792,931 A | 12/1988 | Nishida et al. | |
| 5,488,865 A | 2/1996 | Peters | |
| 6,412,592 B1 * | 7/2002 | Meynier | 181/122 |
| 7,225,662 B2 | 6/2007 | Kamata | |
| 7,406,002 B2 * | 7/2008 | Schleisiek et al. | 367/182 |
| 7,505,369 B2 * | 3/2009 | Hagedoorn | 367/183 |
| 7,775,099 B2 * | 8/2010 | Bogath et al. | 73/152.49 |
| 2010/0296366 A1 | 11/2010 | Kamata | |

* cited by examiner

*Primary Examiner* — Ian J Lobo
(74) *Attorney, Agent, or Firm* — Daryl R. Wright; Jody DeStefanis

(57) ABSTRACT

Methods and systems utilizing seismic sensors configured or designed for use in seismic signal detection. The seismic sensors output displacement signals of a displacement sensor superimposed on velocity signals generated by a moving coil of the seismic sensors.

20 Claims, 22 Drawing Sheets

METHODS AND SYSTEMS FOR SEISMIC SIGNAL DETECTION

This application claims the benefit of U.S. Provisional Application No. 61/382,916, filed Sep. 14, 2010, the contents of which are herein incorporated by reference for all purposes.

BACKGROUND

The present invention relates to devices for sensing vibrations in earth formations. More specifically, the present disclosure is directed to electrodynamic sensing devices, such as geophones and seismometers, that have a moving coil placed in a magnetic field in a centered position. The present disclosure may be applicable to other types of vibration transducers, either in sensing or transmitting operation.

In the oil and gas industry seismic sensors are deployed at various locations, such as on the earth surface, in the sea, at the seabed, or in a borehole, to provide operationally significant subsurface structural and material information by measuring seismic signals reflected from changes in the subsurface structures. In this, seismic sensors are commonly used for purposes of obtaining useful data relating to acoustic impedance contrasts in subsurface structures.

Seismic sensors are also prevalent in earthquake monitoring, long term monitoring for water and $CO_2$ reservoirs, nuclear test monitoring, and such like activity that require the accurate and efficient acquisition of seismic data.

In seismic signal detection, the vibrations in the earth resulting from a source of seismic energy are sensed at discrete locations by sensors, and the output of the sensors used to determine the structure of the underground formations. The source of seismic energy can be natural, such as earthquakes and other tectonic activity, subsidence, volcanic activity or the like, or man-made such as acoustic signals from surface or underground operations, or from deliberate operation of seismic sources at the surface or underground. For example, the sensed seismic signals may be direct signals that are derived from micro-seismicity induced by fracturing or reservoir collapse or alteration, or reflected signals that are derived from an artificial source of energy.

Sensors fall into two main categories; hydrophones which sense the pressure field resulting from a seismic source, or geophones which sense particle motion arising from a seismic source.

As depicted in FIG. 1A, a typical geophone 10 has one or more cylindrical moving coil 12 that is suspended by springs 20 so as to be disposed around a magnet 15 having pole pieces 16. The geophone 10 has a housing 14 and end caps 18. Each moving coil 12 is maintained at a neutral, rest position by the springs 20, and is free to oscillate in a magnetic field of the magnet 15 from a centered position thereof. Springs 20 are usually made with a sheet metal designed to maintain the coil 12 at a centered, equilibrium position relative to the magnetic field of the magnet 15. In a geophone that is designed for vertical operation, the springs 20 are pre-stressed to centralize the moving coil 12 in the magnetic field against gravitational acceleration.

When the earth moves due to the seismic energy propagating either directly from the source or via an underground reflector, the geophone, which can be located at the earth's surface, in the sea or at the seabed, or on the wall of a borehole which penetrates the earth, moves with the particle motion caused by acoustic wave propagation.

If the axis of the geophone is aligned with the direction of motion, however, the moving coil mounted on the spring inside the geophone stays in the same position causing relative motion of the coil with respect to the housing. When the coil moves in the magnetic field, a voltage is induced in the coil which can be output as a signal.

FIG. 1B is a schematic depiction of a geophone in which $x_0$ is the neutral position of the moving coil, x is the position of the coil in motion and $\xi$ is the relative displacement of the coil against the center of the magnetic field. The spring and mass system creates a natural frequency, $\omega_0 = \sqrt{k/m}$, where k is the spring constant and m is the moving mass of the coil assembly. The movement of the moving coil relative to the magnetic field generates an electric output $$e_g = S_0 \frac{d\xi}{dt}$$

where $S_0$ is the sensitivity and $$\frac{d\xi}{dt}$$

is the velocity of the coil above the natural frequency of the geophone. The generated electric signal flows through the shunt resistor $R_s$ and coil. The current i in the coil damps the movement of the coil.

In seismicity monitoring, it is desirable to measure the position or displacement of the seismic sensor moving coil relative to the magnetic field in the seismic sensor housing. Co-pending, commonly owned, U.S. patent application Ser. No. 12/471,467, titled "Methods and Systems for Seismic Signal Detection", describes in detail the importance and use of displacement data in seismicity monitoring.

As described in the aforementioned patent application, it is possible to lower the natural frequency of a geophone by using positive displacement feedback. Additionally, displacement and velocity signals may be combined to obtain a wide frequency response. Furthermore, it is possible to use calibration to determine feedback parameters and to equalize the geophone response by adding the integral of displacement, i.e., an open loop control.

As further described in the aforementioned patent application, borehole geophones are expected to work under tilt since a borehole can be deviated. However, if a geophone is tilted, i.e., is moved away from the orientation that it is designed for, the pre-stressed springs cause the moving coil to move in the upward direction. Therefore, the moving coil is displaced from its neutral position relative to the vertical position of the geophone.

Furthermore, after installation in a deep hole a geophone may be required to continuously monitor seismicity for many years. The geophone is expected to function reliably for a long time at high temperatures. However, over time there is creep in the springs due to the affect of high temperatures. Since spring creep causes the coil to be displaced from the center over time the geophone response also changes.

When the moving coil is not centered in the magnetic flux field, the open circuit sensitivity, $S_0$ and open circuit damping, $D_0$ are reduced and total harmonic distortion becomes large. In this, if a vertical geophone is tilted from its vertical position the geophone response parameters $S_o$, $D_o$, and $f_o$ change based on the amount of tilt. Changes in geophone response parameters change the waveform of recorded seismic signals, which is not desirable for the analysis of the recorded data.

The aforementioned patent application provides solutions to the problems discussed above relating to tilted geophones and spring creep. As also noted therein, it is desirable to determine the amount of displacement of the moving coil of a geophone in order to compensate for tilt and spring creep using electrical levitation.

Applicant further recognized that it is often desirable to measure low frequency signals, for example, to study the source mechanism of an earthquake or the seismicity as a result of fault movement. In this, the scale of a fault slip may be misread because of the insensitivity of a seismic sensor at low frequencies. A seismometer having a simple structure is similar to a geophone with a large moving coil and a large spring to reduce the natural frequency. However, the displacement response of the moving mass of such a geophone is large, and the velocity is small at low frequencies. Therefore, for low frequencies it is desirable to measure the displacement of the moving coil because the electrical signal is large.

In the past, moving coil displacement data has been acquired by, for example, providing an additional position sensor in the seismic sensor. However, extraction of displacement signals from a moving mass of the seismic sensor poses problems with respect to the wiring since there is one pair of springs that typically is used for the output of velocity signals from the moving coil of the seismic sensor. In addition, as discussed in further detail below, conventional mechanisms such as pigtail connectors are not suitable for the purposes described herein.

The limitations of conventional seismic sensor designs noted in the preceding are not intended to be exhaustive but rather are among many which may reduce the effectiveness of previously known sensor mechanisms. The above should be sufficient, however, to demonstrate that sensor structures existing in the past will admit to worthwhile improvement.

SUMMARY OF THE DISCLOSURE

Embodiments disclosed herein provide methods and systems for seismic sensors, such as geophones and seismometers. In particular, some embodiments of the present disclosure provide methods and systems having seismic sensors that provide the capability to measure the displacement of the seismic sensors' moving mass relative to the housing. In some embodiments disclosed herein, the seismic sensors of the present disclosure are provided with a displacement sensor that is configured or designed using differential transformer technology. In this, the displacement sensors of the present disclosure utilize the same moving coil that generates velocity signals for purposes of measuring the location of the moving coil relative to the housing and thereby deriving the displacement of seismic signals that are sensed by the seismic sensor.

The applicant recognized that by superimposition of displacement signals on the velocity signals that are output by the moving coil of a seismic sensor the shortcomings and problems relating to the extraction of displacement signals from the moving mass could be eliminated. The applicant further recognized that using differential transformer technology in designing displacement sensors would eliminate the shortcomings and problems that exist in displacement sensors of the past. The applicant has proposed herein various ways to structure and arrange displacement sensors in geophone seismic sensors, including displacement sensors that are based on differential transformer technology, for utilization in various seismic data acquisition and monitoring operations including, but not limited to, land seismic, seabed seismic, downhole applications, among others.

In certain embodiments of the present disclosure, a seismic sensor comprises a housing; at least one magnet mounted within the housing; a moving coil mounted within the housing; at least one spring assembly connected to the housing and the moving coil for supporting the moving coil for transduction within the housing; and a stationary coil mounted within the housing so as to be stationary relative to the housing. The moving coil of the seismic sensor generates velocity signals based on a first magnetic flux field of the magnet and senses a second magnetic flux field of the stationary coil relative to a position of the moving coil.

The first magnetic flux field of the magnet may be a DC magnetic flux field and the second magnetic flux field of the stationary coil may be an AC magnetic flux field. The seismic sensor may further comprise a digital signal processor in communication with the seismic sensor and a set of instructions executable by the processor that, when executed, measure displacement of the moving coil relative to the housing so as to determine displacement of seismic signals detected by the seismic sensor.

In other embodiments of the present disclosure, the seismic sensor may be configured or designed for low frequency seismic signal detection of seismic signals less than about 5 Hz.

In aspects of the present disclosure, a seismic sensor may comprise a displacement sensor for detecting displacement of the moving coil relative to the housing such that displacement signals of the displacement sensor are superimposed on velocity signals generated by the moving coil. In aspects herein, the displacement sensor may comprise a capacitance displacement sensor. In other aspects of the present disclosure, the displacement sensor may comprise a differential transformer displacement sensor.

In certain embodiments of the present disclosure, the seismic sensor may comprise a digital signal processor in communication with the seismic sensor and configured or designed to extract displacement signals of the displacement sensor and velocity signals of the moving coil from output signals of the seismic sensor. In other embodiments of the present disclosure, the seismic sensor may include a reference signal generator for generating a reference signal, and the digital signal processor may be further configured or designed to derive displacement of the moving coil from the displacement signals by multiplication of the reference signal and output signals of the displacement sensor. In yet other embodiments of the present disclosure, a digital signal processor may be provided in communication with the seismic sensor and a reference signal generator for generating a reference signal to the displacement sensor, wherein the digital signal processor may be configured or designed to derive sensor temperature based on the reference signal to the displacement sensor.

In one embodiment of the present disclosure, a system for use in seismic signal detection comprises at least one seismic sensor having a housing; at least one magnet mounted within the housing; a moving coil within the housing structured and arranged so as to be fixed in a radial direction relative to the housing and movable in an axial direction thereof; and a stationary coil within the housing that is stationary relative to the housing, wherein the moving coil of the seismic sensor generates velocity signals based on a first magnetic flux field of the magnet and senses a second magnetic flux field of the stationary coil relative to a position of the moving coil. A digital signal processor is in communication with the seismic sensor and a set of instructions executable by the processor that, when executed, measure the displacement of the moving coil relative to the housing so as to determine displacement of seismic signals detected by the seismic sensor.

The seismic sensor may be configured or designed for downhole use in a borehole; for permanent or semi-permanent installation in seismic signal detection; or for long term deployment in high-temperature environments.

In aspects of the present disclosure, an electrical circuit may be configured or designed to provide a positive displacement feedback signal to an output of the seismic sensor such that the natural frequency of the seismic sensor is reduced.

In yet other embodiments, the system may be configured or designed to provide an output signal comprising a combination of velocity and displacement signals output from the seismic sensor.

In certain embodiments of the present disclosure, a method of seismic signal detection comprises deploying at least one seismic sensor at a location for seismic signal detection; providing an electrical signal to a stationary coil of the seismic sensor; detecting seismic signals with the at least one seismic sensor; and outputting velocity and displacement signals from the seismic sensor based on the sensed seismic signals and the electrical signal to the stationary coil of the seismic sensor. The moving coil of the seismic sensor may be configured to generate velocity signals based on a first magnetic flux field and to sense a second magnetic flux field of the stationary coil relative to a position of the moving coil.

In yet other embodiments of the present disclosure, a method of seismic signal detection comprises deploying at least one seismic sensor at a location for seismic signal detection; detecting seismic signals with the at least one seismic sensor; and outputting velocity and displacement signals from the seismic sensor based on the detected seismic signals, wherein the seismic sensor is configured or designed to output displacement signals of the displacement sensor superimposed on velocity signals generated by a moving coil of the seismic sensor.

In embodiments of the present disclosure, a system for use in seismic signal detection is provided having at least one seismic sensor. The seismic sensor comprising a housing; at least one magnet for creating a DC magnetic flux field mounted within the housing; a moving coil within the housing structured and arranged so as to be fixed in a radial direction relative to the housing and movable in an axial direction thereof; and at least one stationary coil for creating an AC magnetic flux field mounted within the housing so as to be stationary relative to the housing, wherein the stationary coil may comprise a differential transformer. In aspects herein, the system may be configured or designed to generate velocity signals based on seismic signals sensed by the seismic sensor and displacement signals based on displacement of the moving coil relative to the housing and to output the displacement signals superimposed on the velocity signals to generate a combined output signal. The system may further include a digital signal processor in communication with the seismic sensor; and a set of instructions executable by the processor that, when executed, measure the displacement of the moving coil relative to the housing so as to determine displacement of the seismic signals sensed by the seismic sensor.

In certain embodiments of the present disclosure, the digital signal processor may be configured or designed to extract the displacement signals and the velocity signals from the combined output signals. In some aspects of the present disclosure, the system may further comprise a reference signal generator for generating a reference signal, and the digital signal processor may be configured to derive phase and amplitude of the displacement signals by multiplication of the reference signal and output signals of the stationary coil.

In certain embodiments of the present disclosure, a method of seismic signal detection using at least one seismic sensor comprises deploying at least one seismic sensor at a location for seismic signal detection; providing a reference electrical signal to a stationary coil of the seismic sensor; detecting displacement of a moving coil of the seismic sensor based on the reference electrical signal; and outputting velocity and displacement signals from the same moving coil of the seismic sensor. In certain embodiments of the present disclosure, the reference electrical signal comprises an AC current for creating an AC magnetic flux field in the seismic sensor.

A method of determining displacement of a moving coil of a seismic sensor comprises providing an electrical signal to a stationary coil of the seismic sensor that is stationary relative to the moving coil; detecting a displacement of the moving coil relative to a housing of the seismic sensor based on the electrical signal; and outputting velocity and displacement signals from the same moving coil of the seismic sensor. In certain embodiments of the present disclosure, the electrical signal comprises an AC current for creating an AC magnetic flux field in the seismic sensor and the moving coil senses the AC magnetic flux field of the stationary coil relative to a position of the moving coil.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Figure 1A:
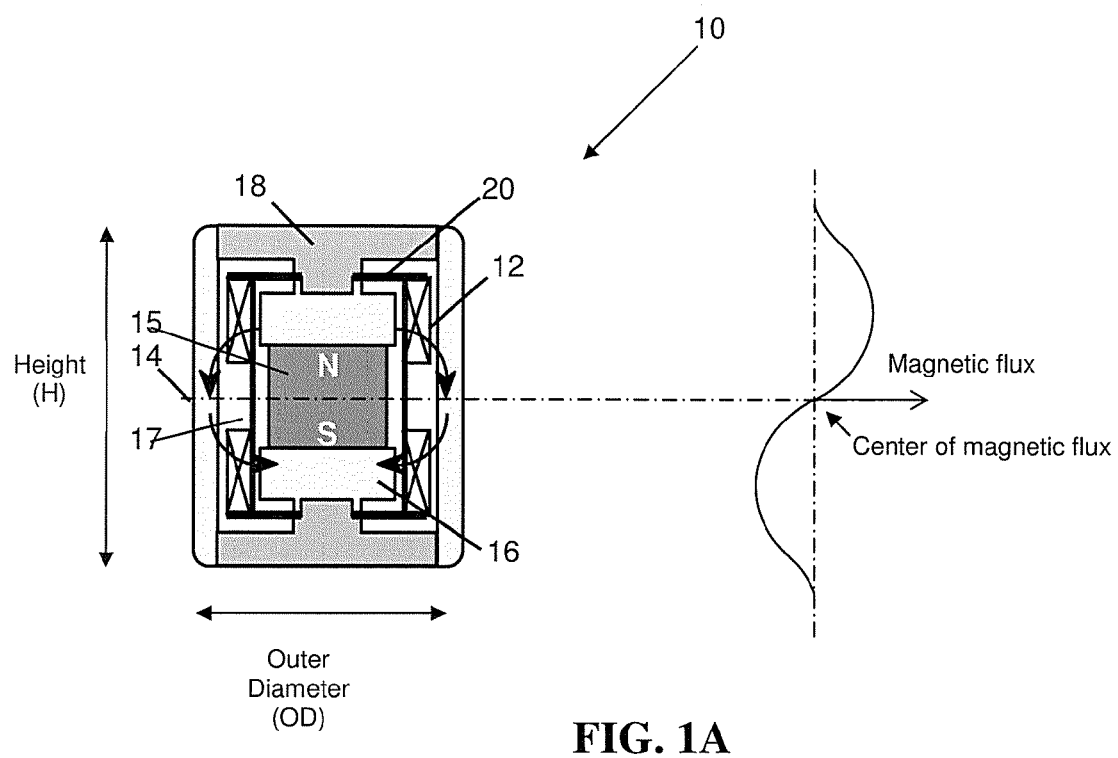
FIG. 1A is a schematic view of a conventional geophone seismic sensor.
Figure 1B:
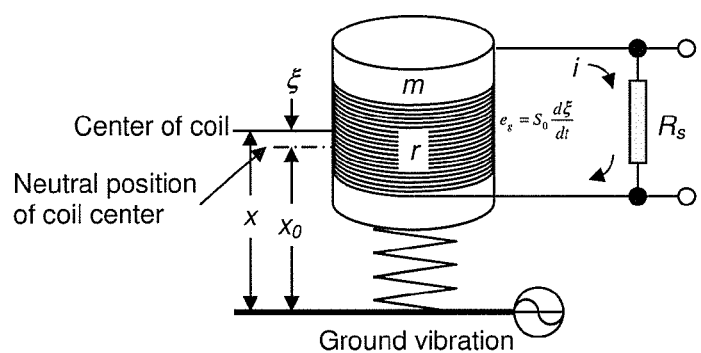
FIG. 1B is a schematic depiction of a geophone seismic sensor to explain principles discussed herein.
Figure 1C:
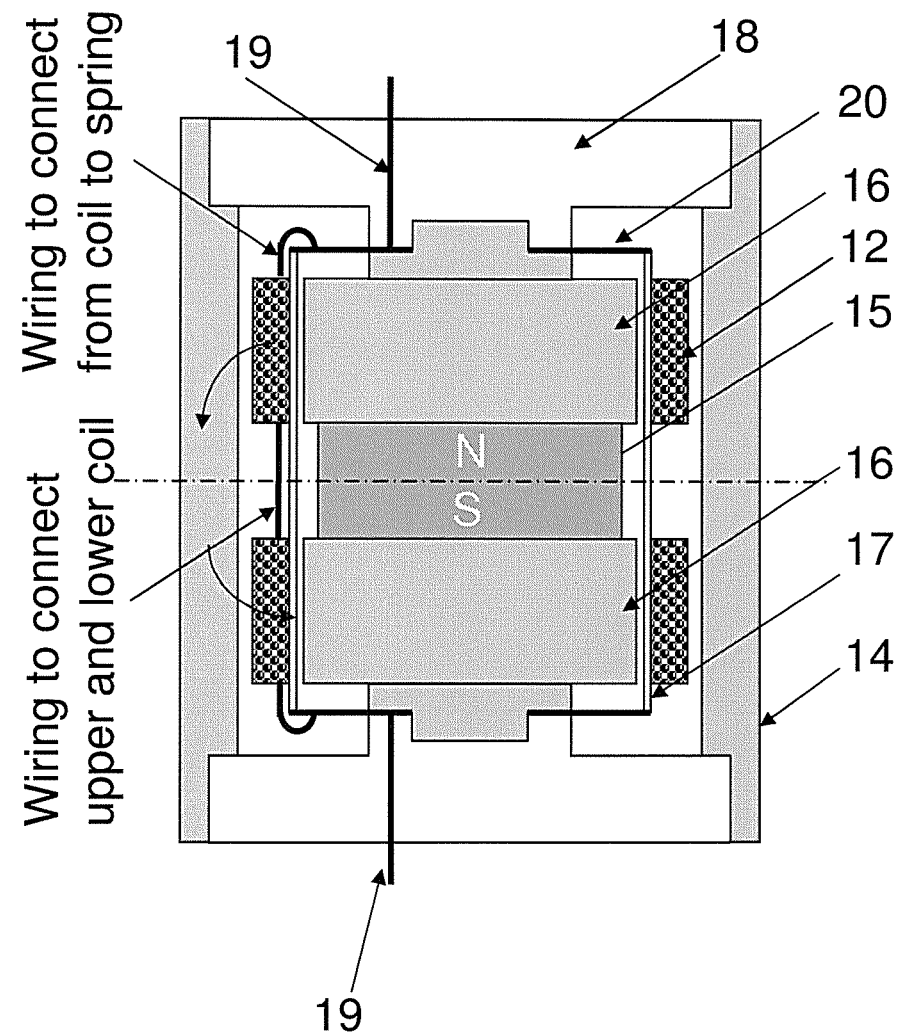
FIG. 1C is a schematic depiction of the mechanism for extraction of electrical signals from a conventional geophone.
Figure 1D:
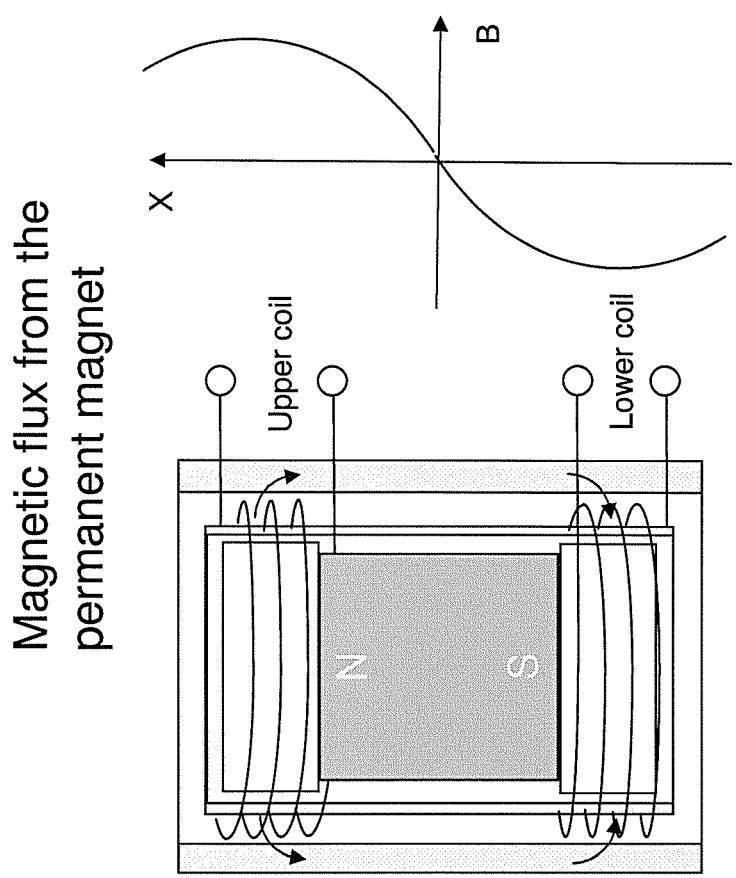

FIG. 1D schematically depicts windings of an upper coil and a lower coil of a geophone moving coil assembly and directions of the magnetic flux field from a permanent magnet of the geophone seismic sensor.

Figure 2A:
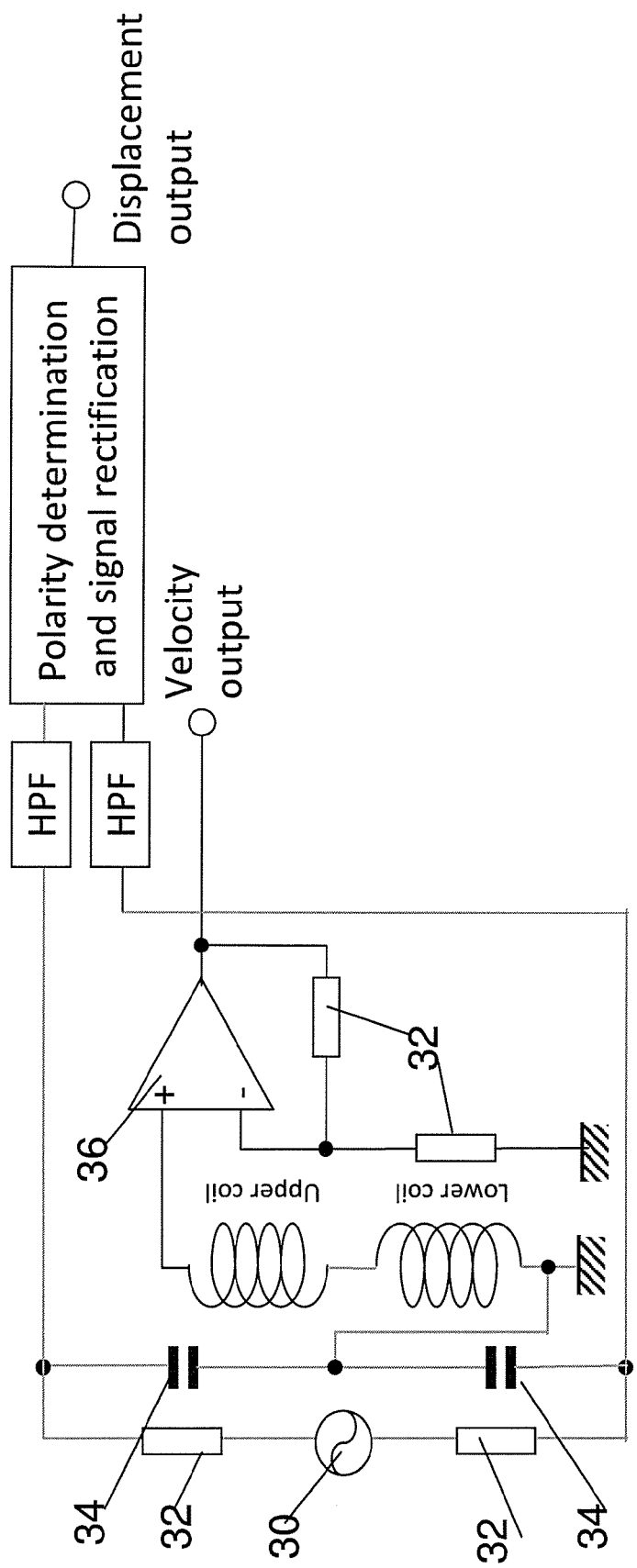

FIG. 2A depicts an exemplary capacitance displacement sensor circuit having common ground wiring of a capacitance signal and a moving coil signal so that the signals from both sensing elements can be extracted from a single spring. The common ground, however, causes cross talk and tends to pickup environmental electrical noise when the electronics are not near the sensor and wiring is not short.

Figure 2B:
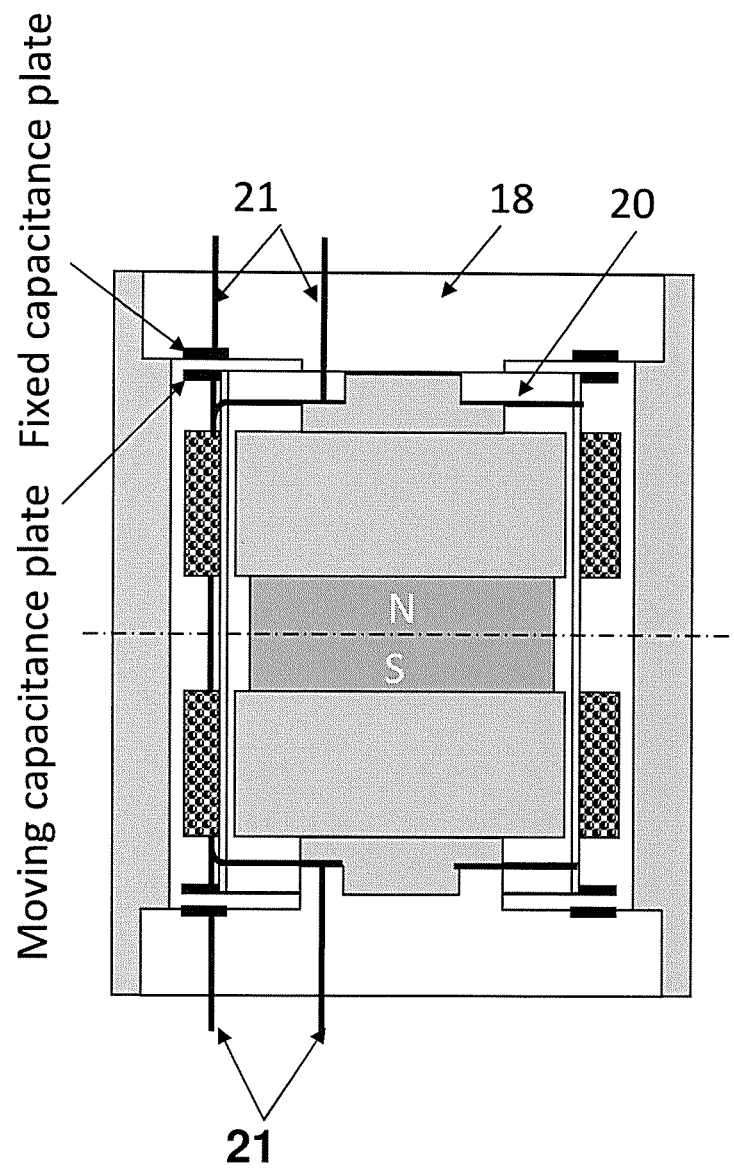

FIG. 2B is a schematic depiction of one possible mechanism according to the present disclosure for extraction of capacitance displacement signals from a conventional geophone.

Figure 2C:
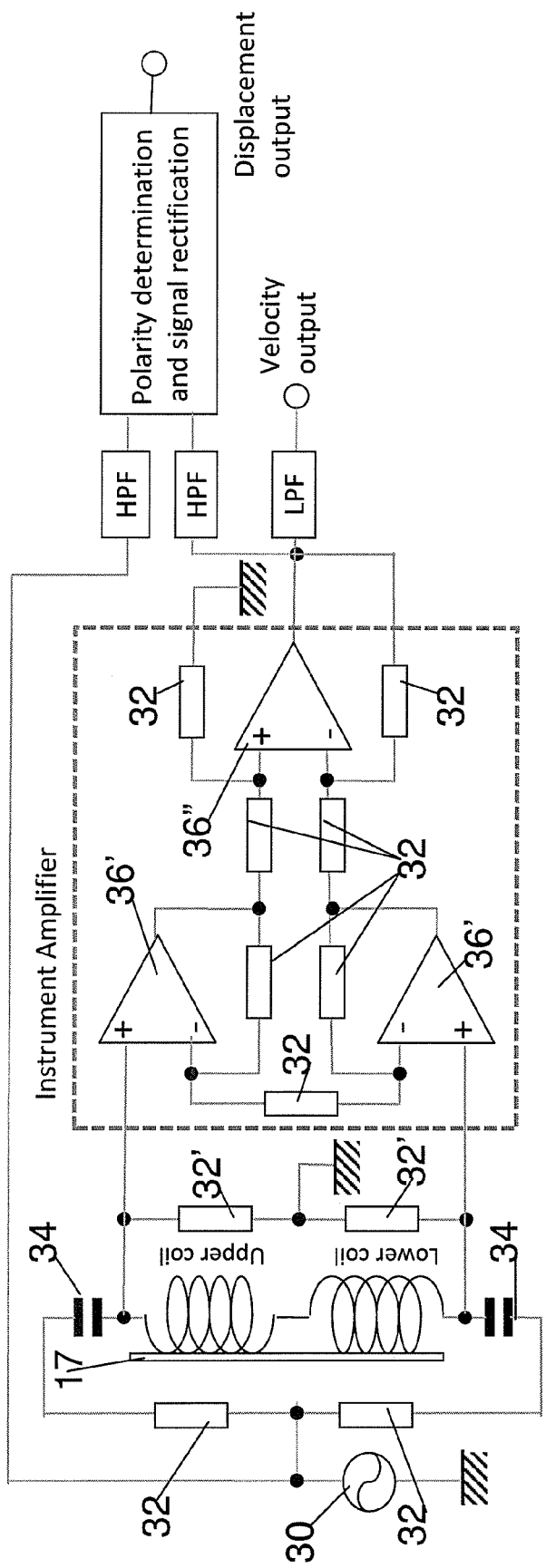

FIG. 2C is a circuit diagram of one possible system for use in combination with the sensor mechanism of FIG. 2B for superimposition of capacitance displacement signals on velocity signals output from a geophone seismic sensor in accordance with the present disclosure.

Figure 3A:
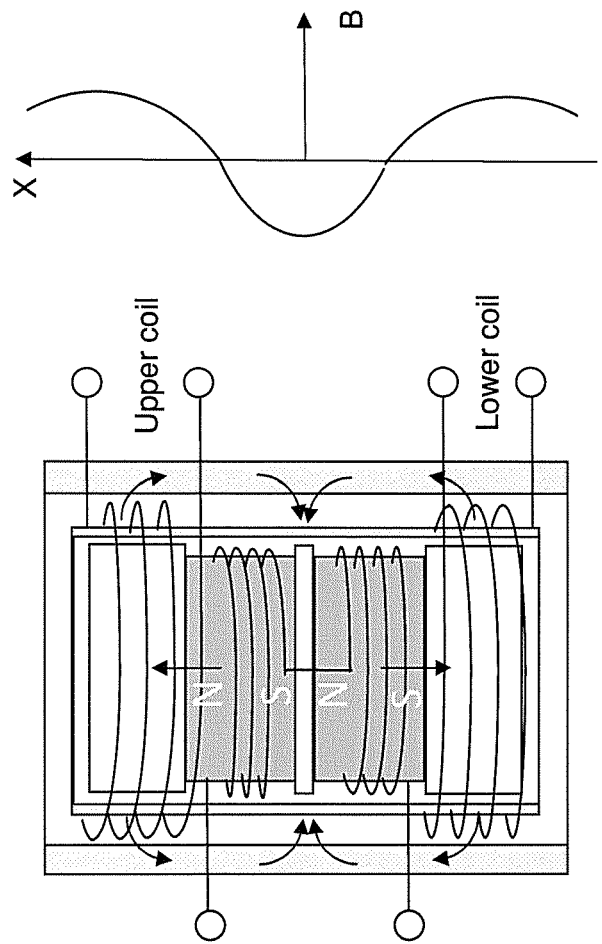

FIG. 3A is a schematic depiction of a differential transformer displacement sensor in accordance with the present disclosure implemented in a conventional geophone seismic sensor to explain principles of the magnetic flux field generated by the stationary coils of the displacement sensor.

Figure 3B:
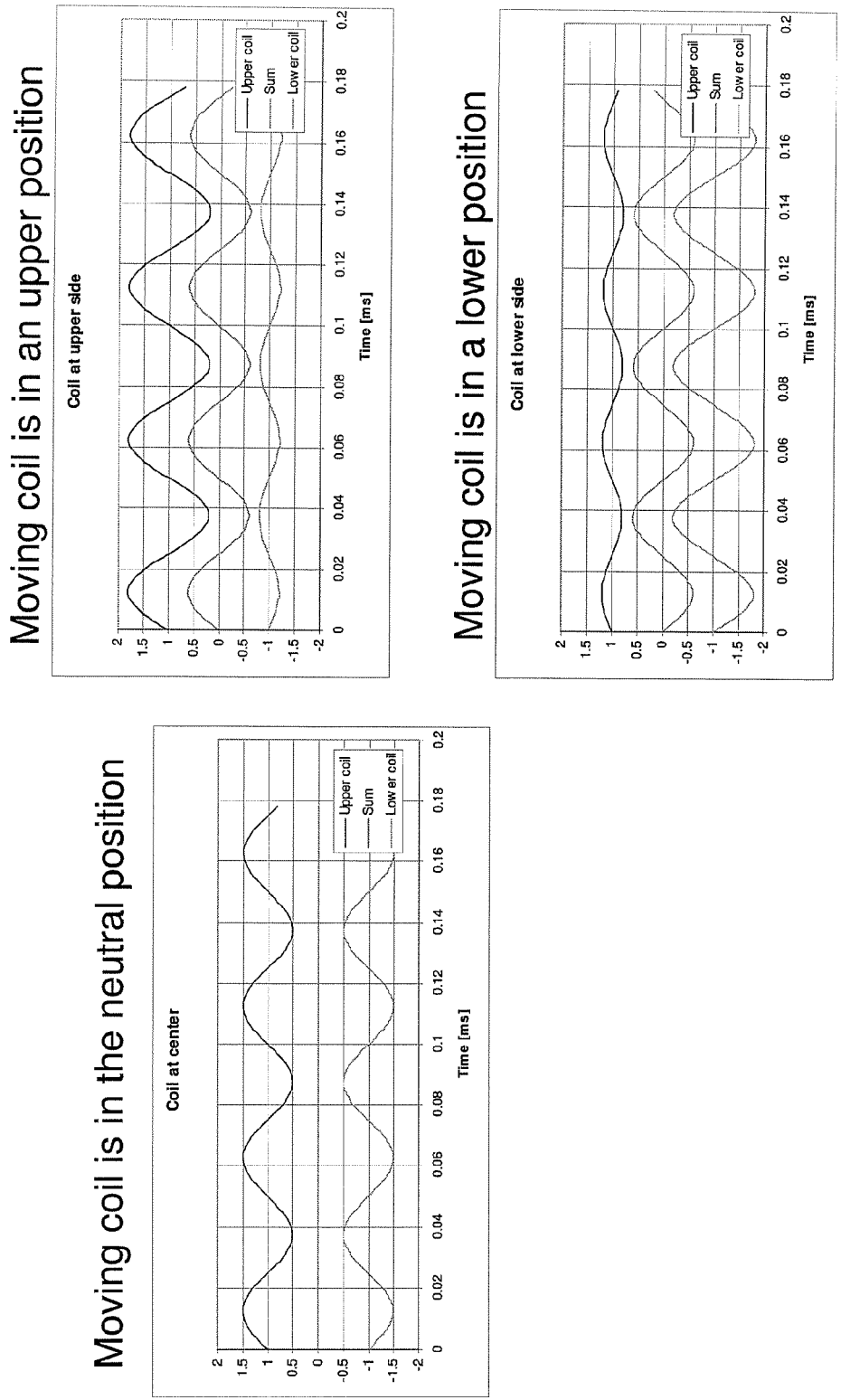

FIG. 3B shows in graphs the signals output from an upper coil and a lower coil of the differential transformer displacement sensor shown in FIG. 3A and the sum of the two signals.

Figure 3C:
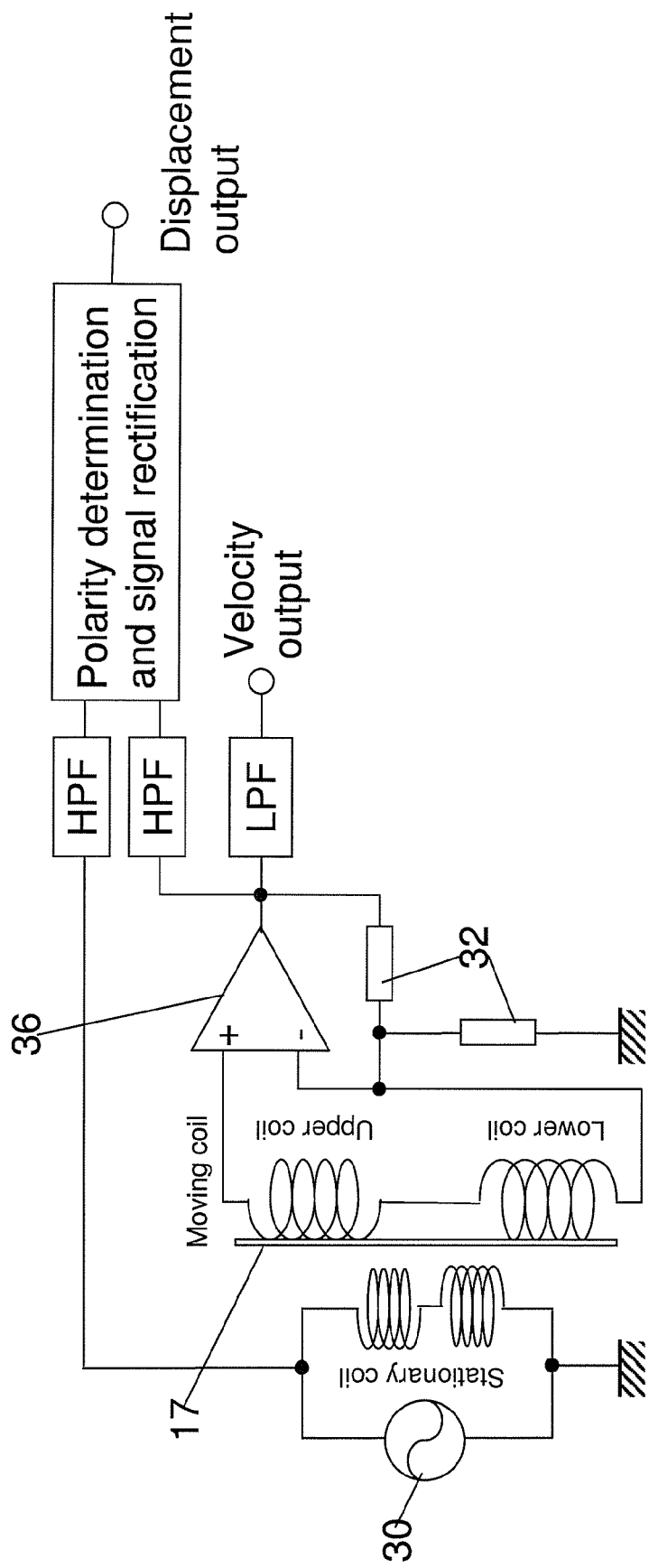

FIG. 3C shows one exemplary circuit diagram for acquiring displacement signals from a differential transformer displacement sensor, and the signal flow to output both velocity and displacement signals in accordance with the present disclosure.

Figure 3D:
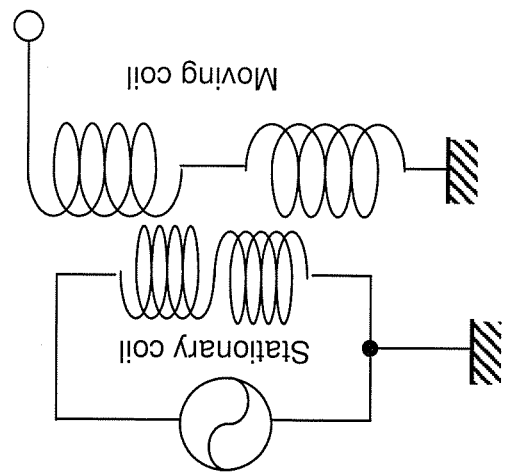
Figure 3D:
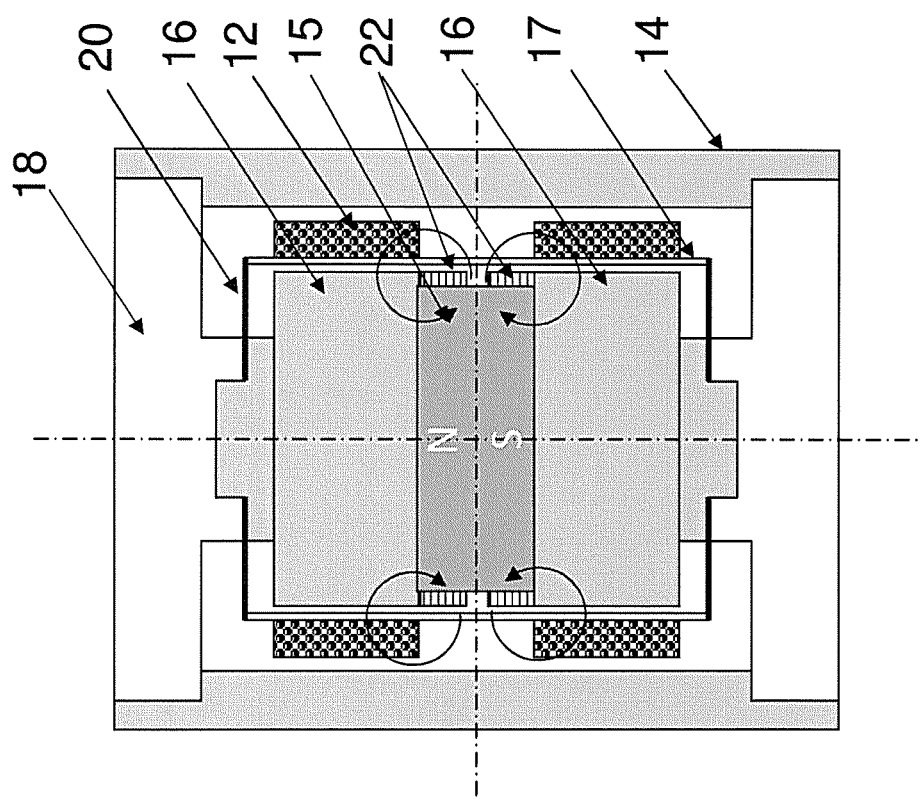

FIG. 3D shows another embodiment of a geophone with a differential transformer displacement sensor according to the present disclosure.

Figure 3E:
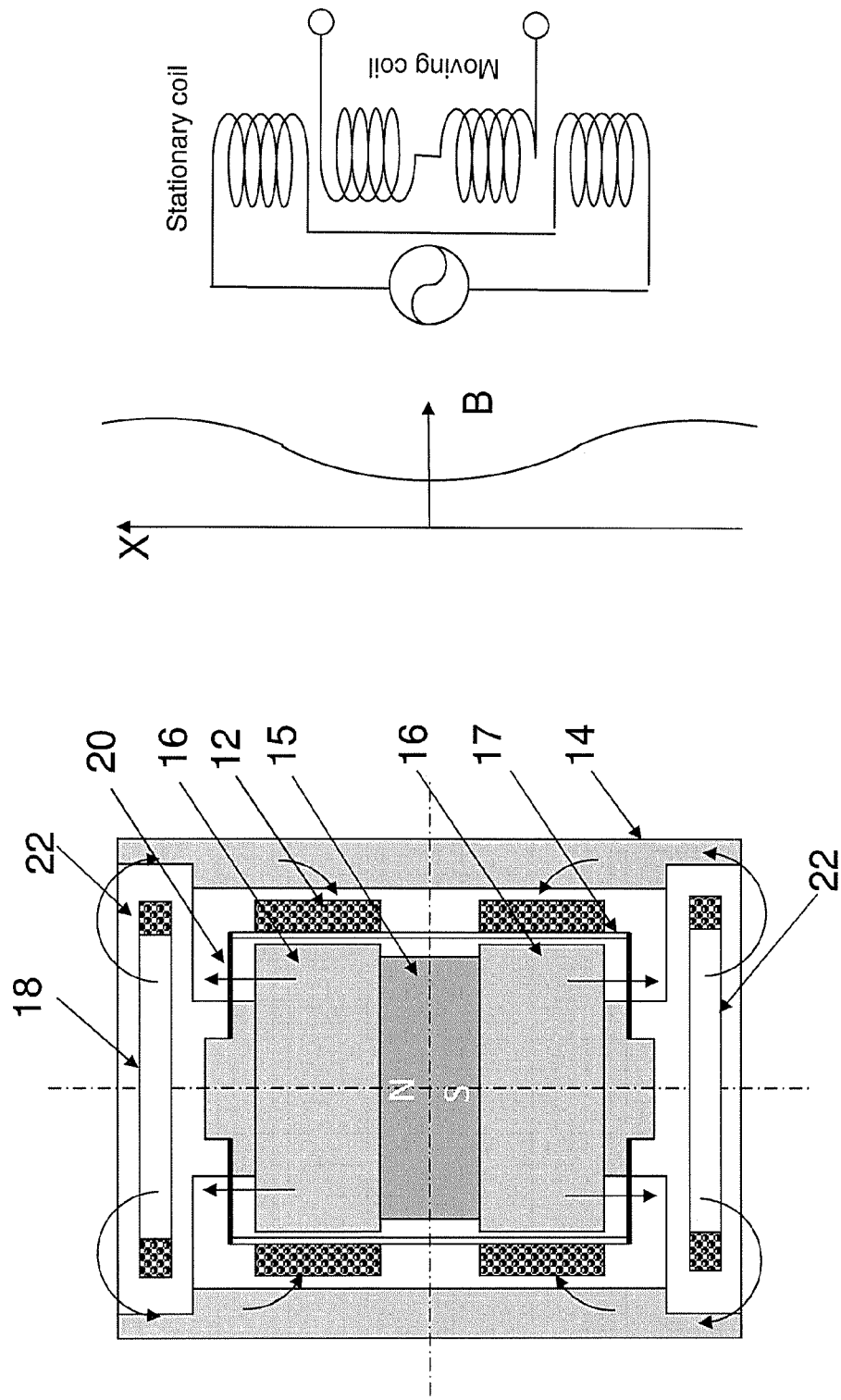

FIG. 3E shows yet another embodiment of a geophone with a differential transformer displacement sensor according to the present disclosure.

Figure 3F:
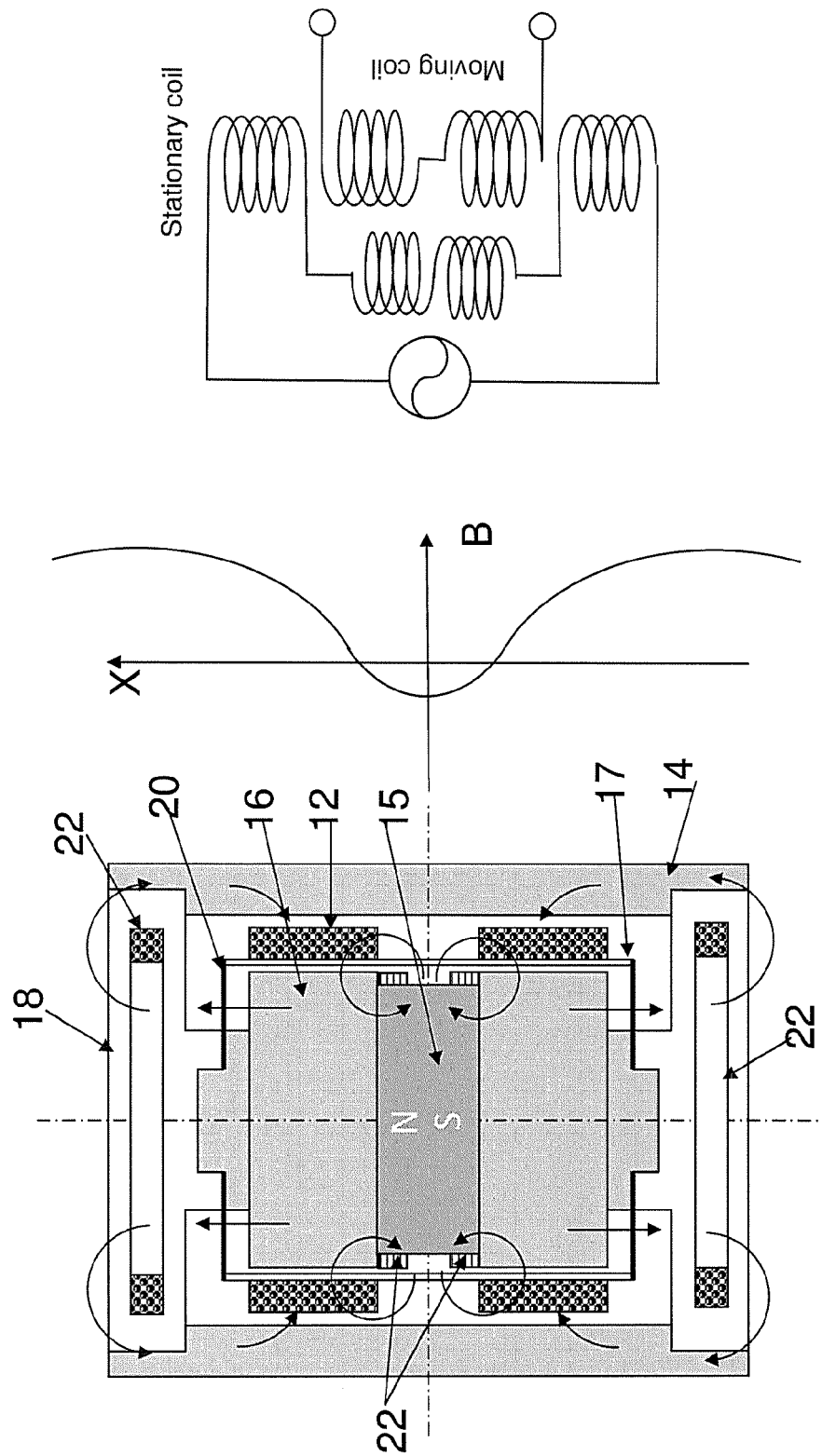

FIG. 3F shows yet another embodiment of a geophone with a differential transformer displacement sensor according to the present disclosure.

Figure 4A:
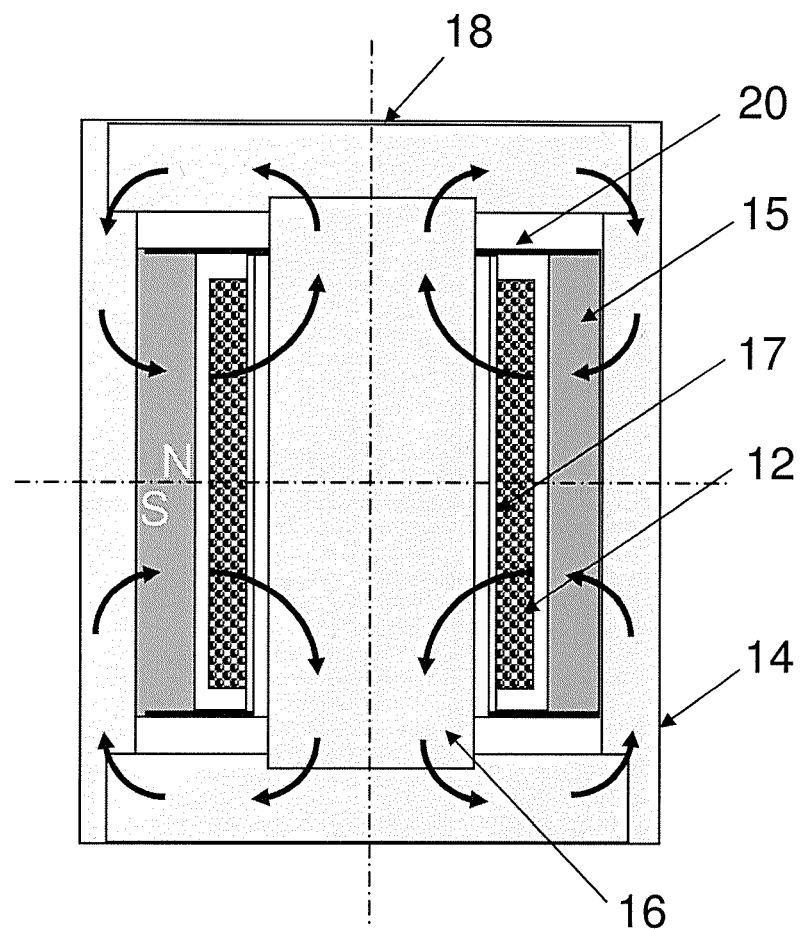

FIG. 4A is a schematic depiction of a geophone accelerometer (GAC) having a single coil.

Figure 4B:
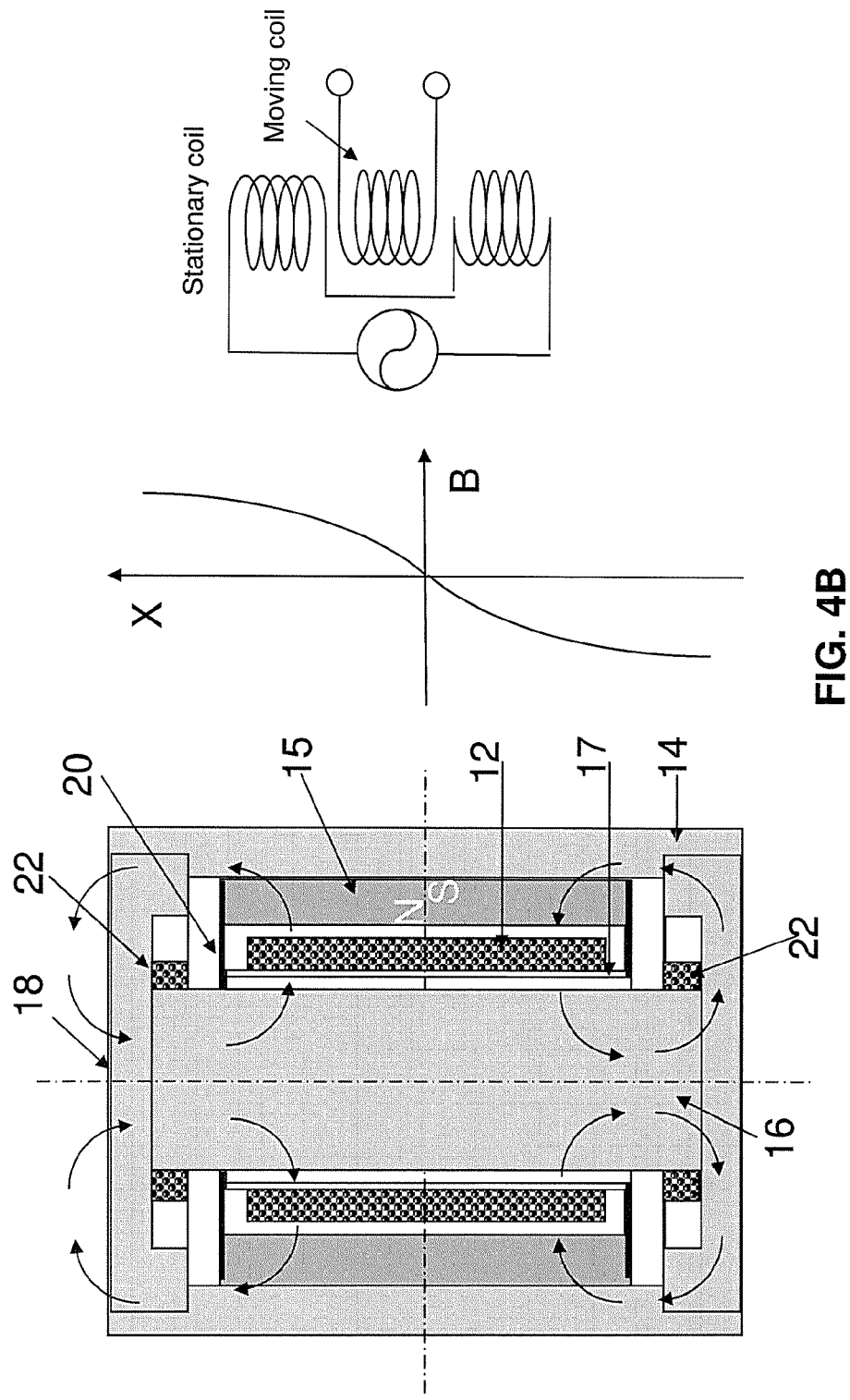

FIG. 4B depicts schematically a GAC having a single coil with a differential transformer displacement sensor in accordance with the present disclosure.

Figure 5A:
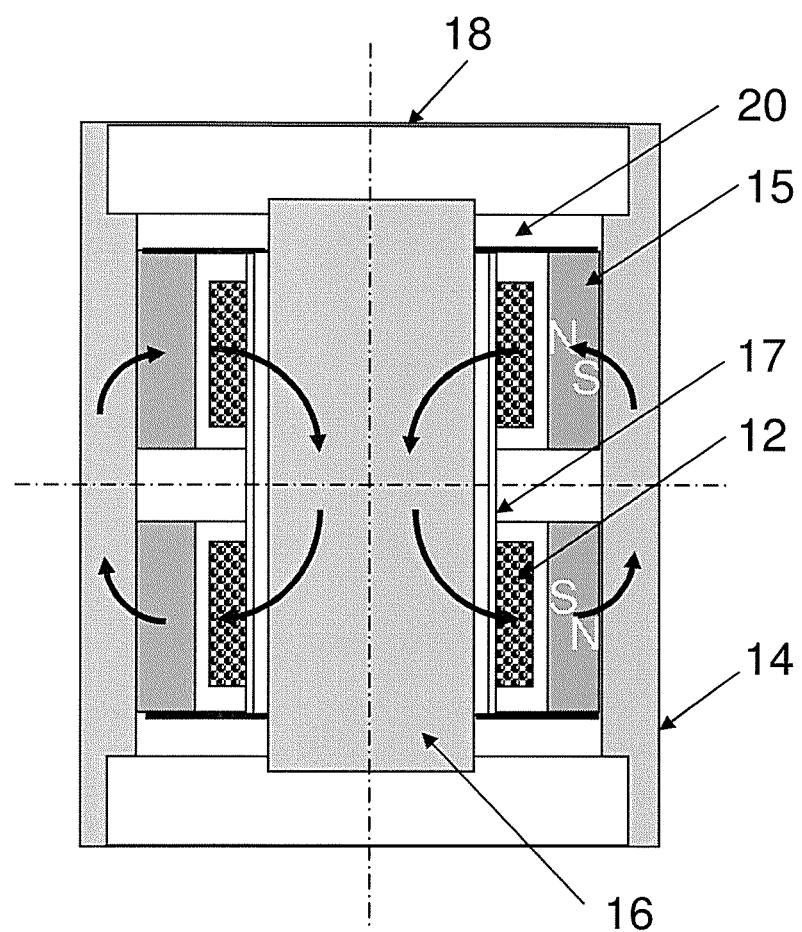

FIG. 5A is a schematic depiction of a GAC having a dual coil.

Figure 5C:
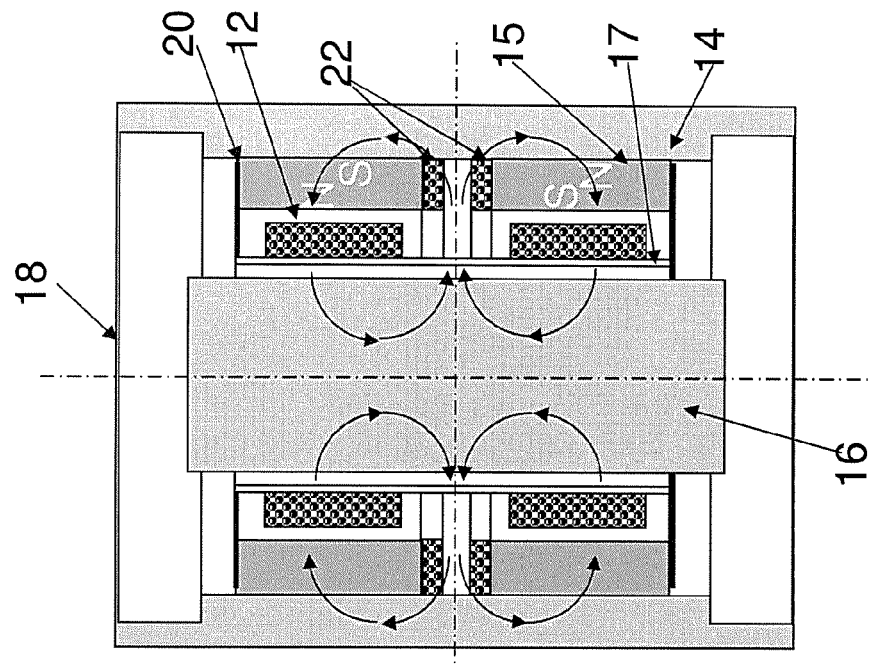
Figure 5B:
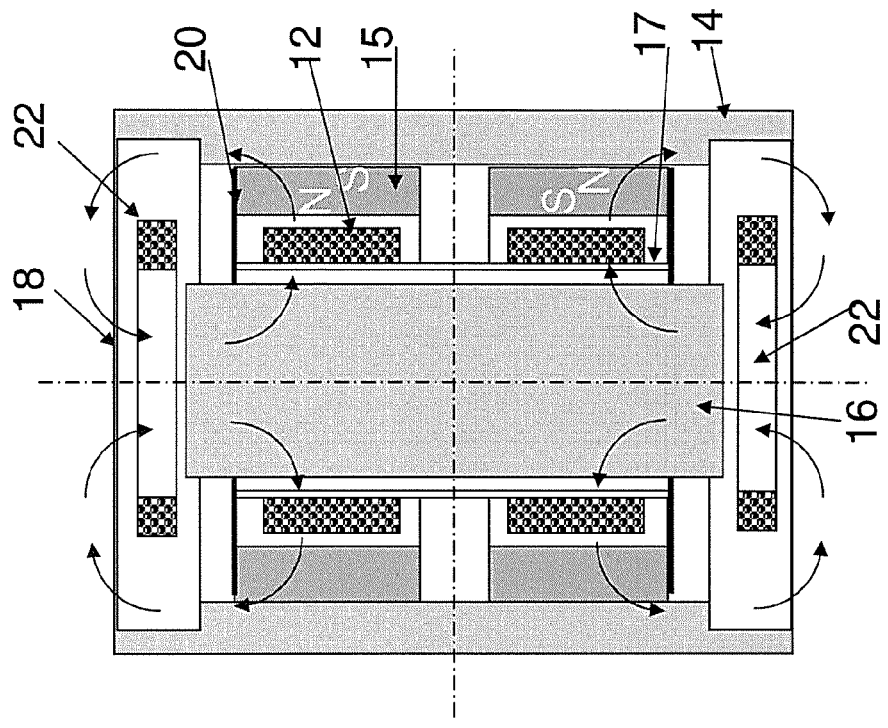

FIGS. 5B and 5C depict schematically GACs having a dual coil with differential transformer displacement sensors in accordance with the present disclosure.

Figure 6A:
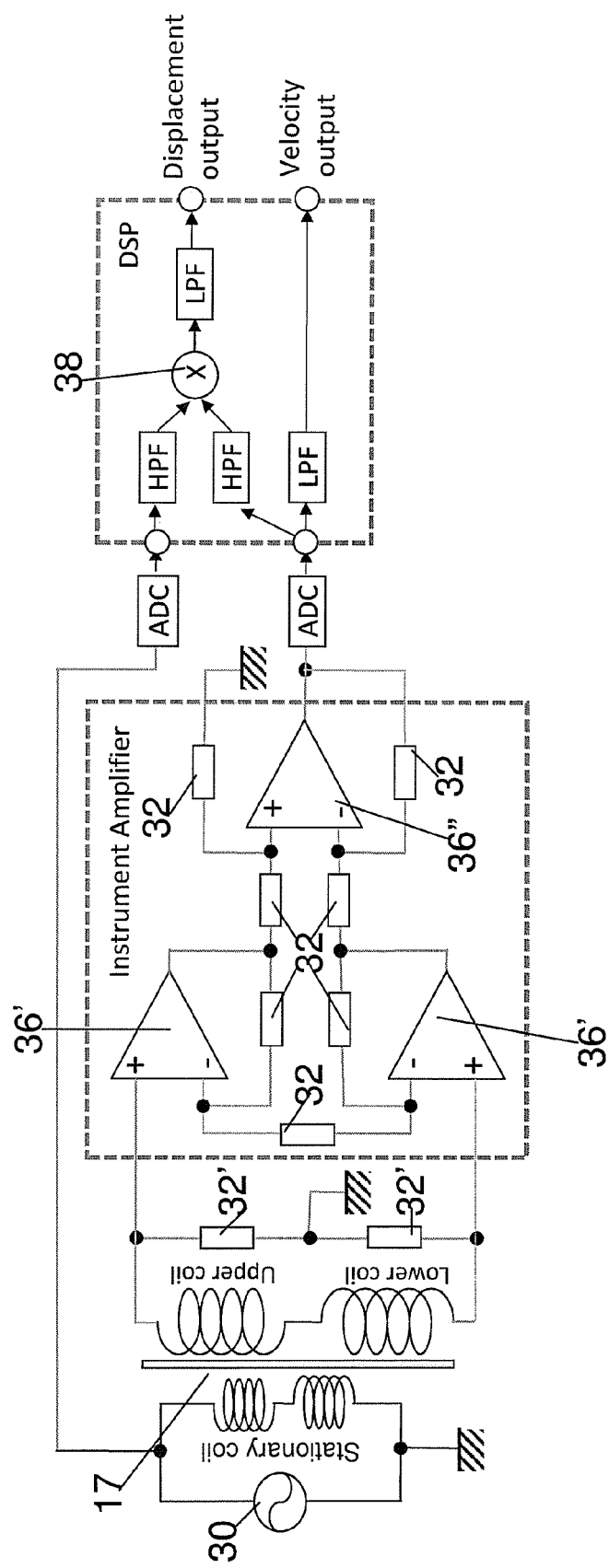

FIG. 6A depicts one possible system for digital signal processing of displacement signals and velocity signals for output from a geophone seismic sensor in accordance with the present disclosure.

Figure 6B:
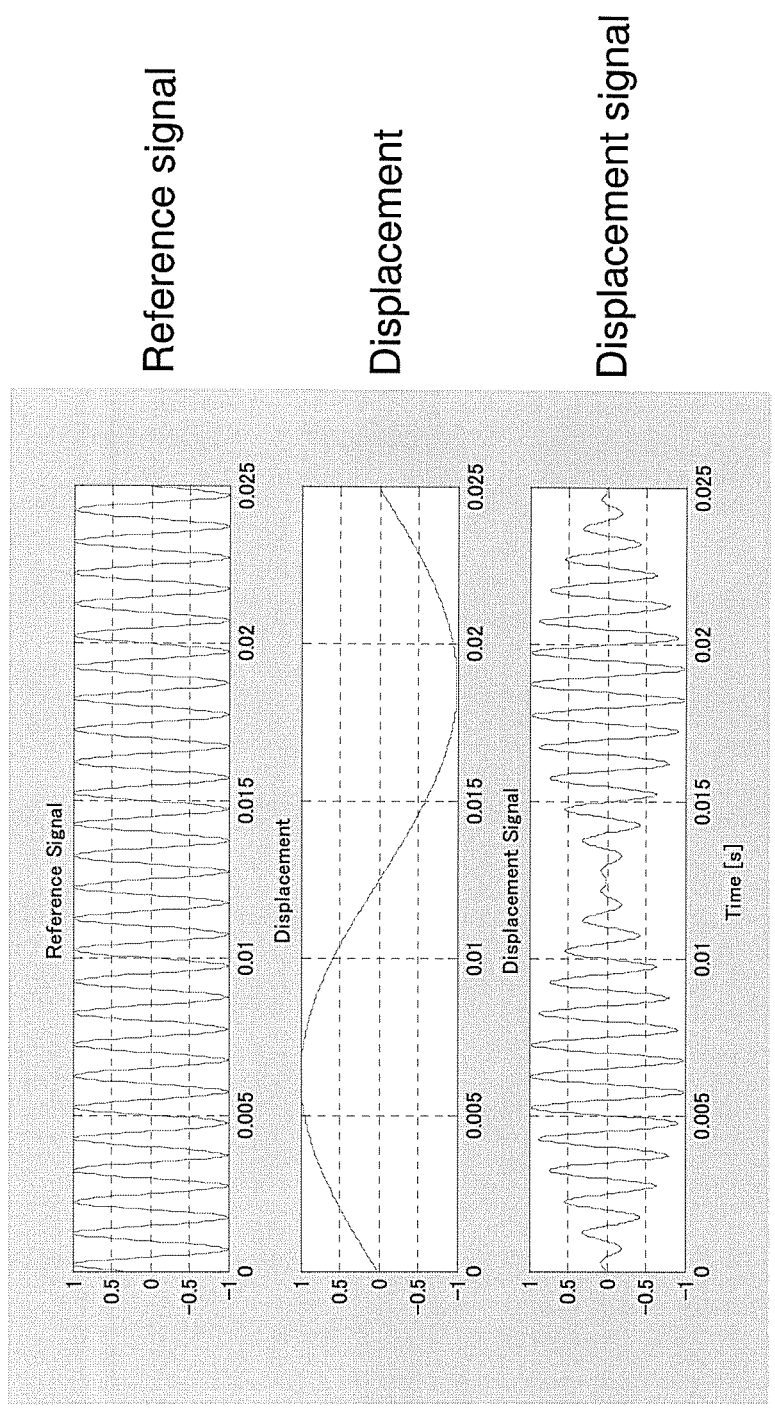

FIG. 6B shows in graphs synthetic data representing a) in the upper graph the reference signal to drive the stationary coil of a seismic sensor; b) in the middle graph the displacement of the moving coil of the seismic sensor; and c) in the lower graph the displacement signal sensed by the moving coil.

Figure 6C:
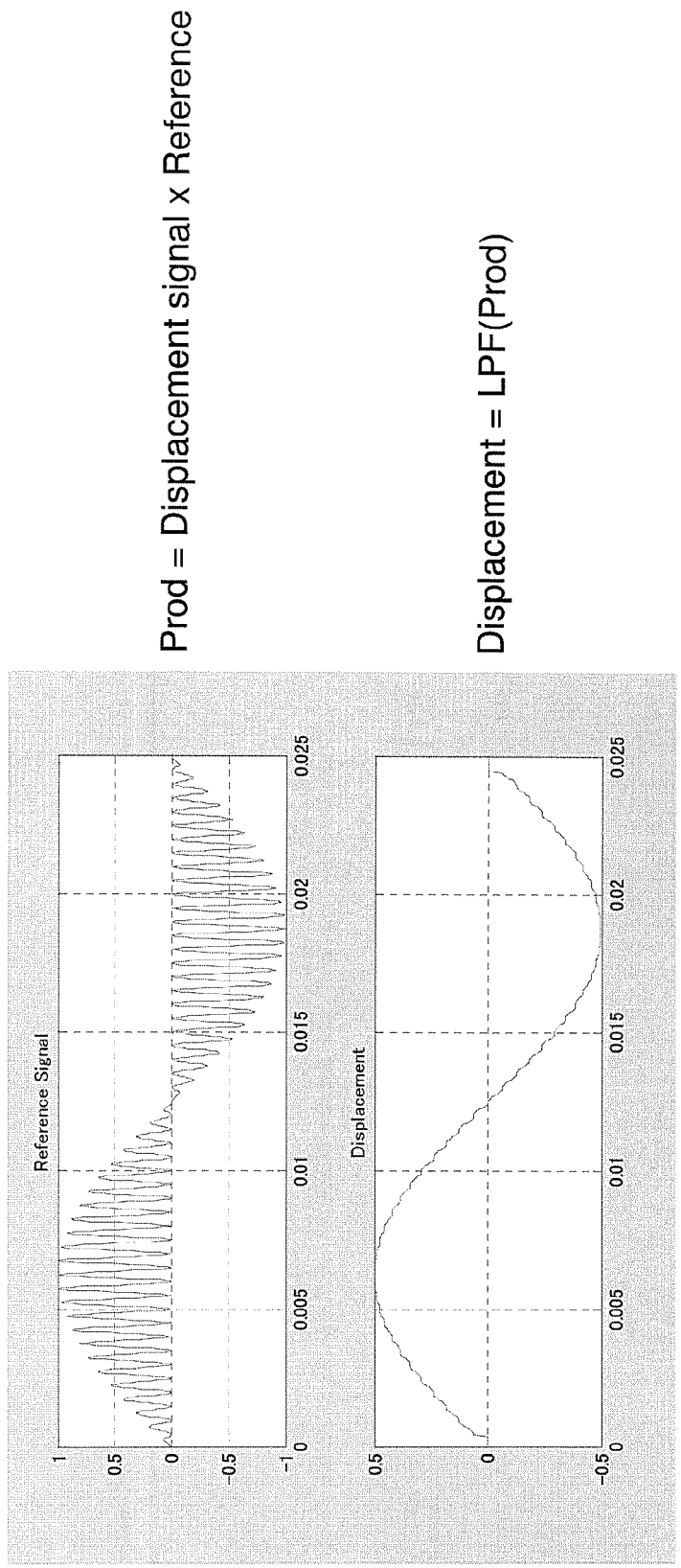

FIG. 6C shows in graphs synthetic data representing the process of reconstruction of displacement from the measured displacement signals.

Figure 6D:
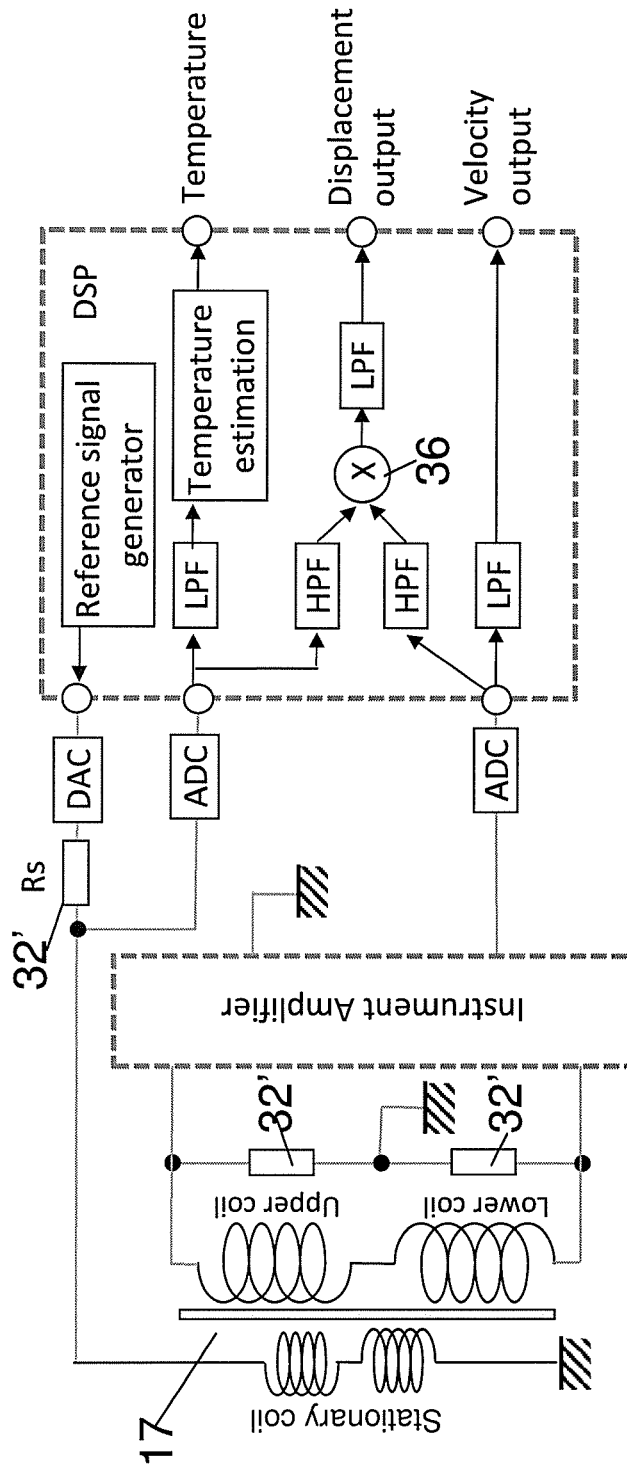

FIG. 6D depicts another possible system for digital signal processing of displacement signals and velocity signals for output from a geophone seismic sensor in accordance with the present disclosure.

Figure 7:
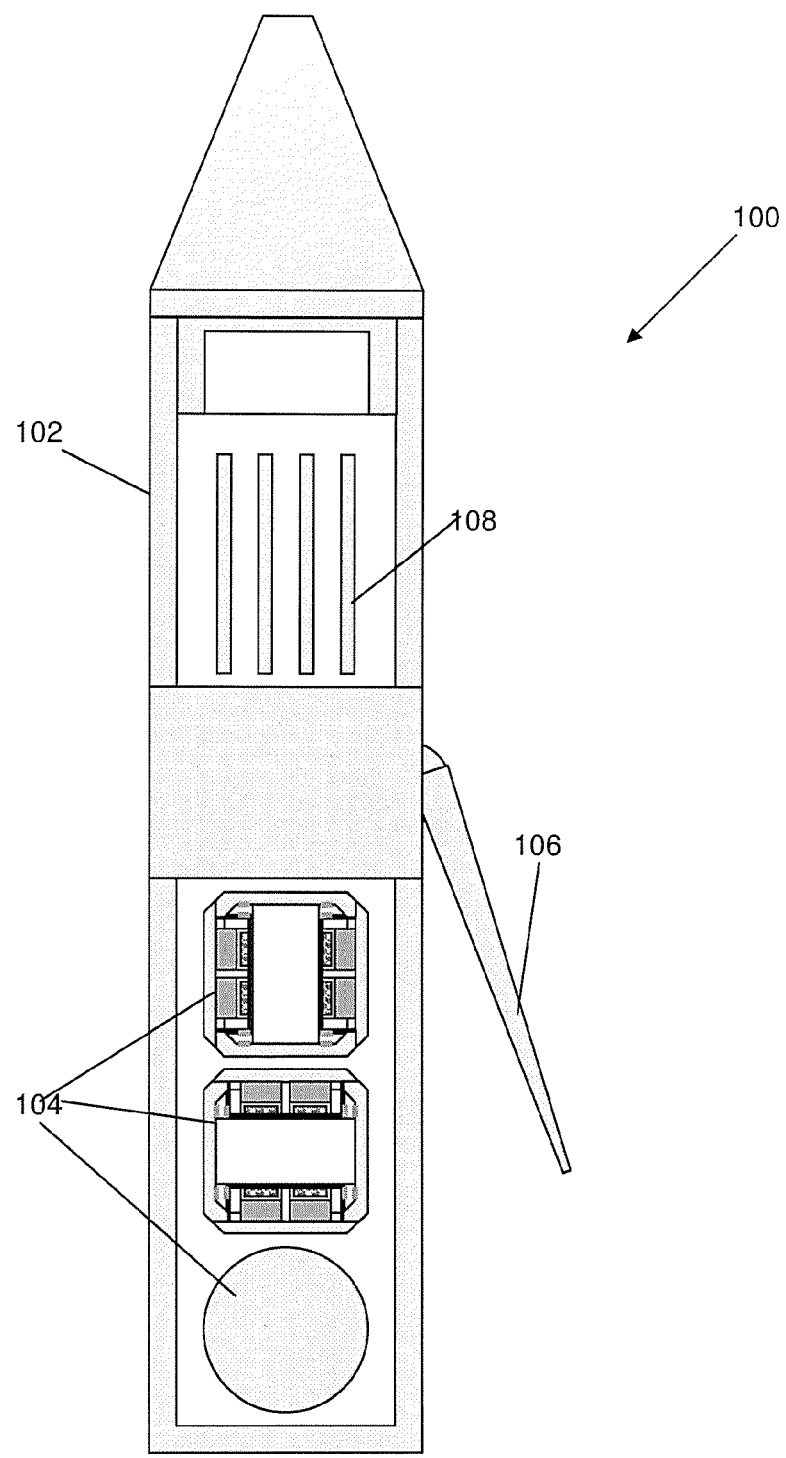

FIG. 7 depicts one exemplary borehole tool having seismic sensors according to the principles of the present disclosure.

Figure 8:
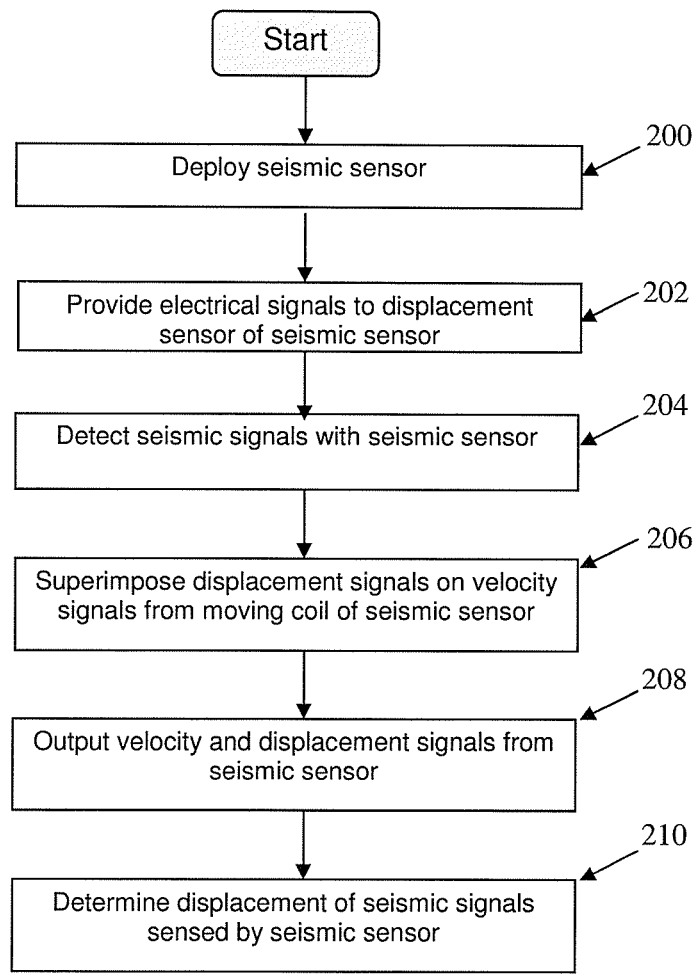

FIG. 8 depicts in a flowchart one possible method for determining displacement of seismic signals sensed by a geophone seismic sensor using displacement signals that are superimposed on velocity signals output from the seismic sensor in accordance with the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Turning now to the drawings, wherein like numerals indicate like parts, the disclosure herein is directed to the concept of various techniques that may be utilized for electrodynamic type sensors, such as a geophone or a seismometer, that are utilized in the field of seismic prospecting, or of active or passive monitoring of underground reservoirs. The sensors may be deployed in exploration and/or production wells, and comprise multi-component geophones for detecting components of signals that are received along a plurality of axes for defining a full seismic wavefield such as, for example, three orthogonal axes. In aspects according to the present disclosure, the seismic sensors may be utilized in wireline systems, land seismic surveying systems, seabed seismic surveying systems, hydro-fracture monitoring, production logging, permanent or other monitoring systems, including systems for monitoring earthquakes or micro-seismicity in a reservoir, among others.

Some principles of the present disclosure are also described in commonly owned U.S. Pat. No. 7,225,662, titled "Geophone Calibration Technique", and co-pending U.S. patent application Ser. No. 12/471,467, titled "Methods and Systems for Seismic Signal Detection", the entire contents of which are hereby incorporated herein by reference.

As described in greater detail below, the present disclosure provides various techniques which may be used to facilitate and improve seismic signal detection.

As used in this application, the term "geophone" is intended to include conventional-type geophones such as that illustrated in FIG. 1A, and very low frequency geophones such as seismometer type electrodynamic sensors, as well as geophone accelerometer (GAC) devices from Schlumberger Corporation which, for example, may be configured or designed to measure relatively wider acceleration ranges than conventional-type geophones.

In order to gain a better understanding of the various techniques and features described herein, a brief description of geophone measurement techniques will now be provided. A seismic survey measures seismic waves that are propagated through the earth to map structural images in the earth. Geophones are often used to detect seismic signals at various locations, such as, for example, downhole, at ground surface and/or at the seabed. An example of a conventional geophone is shown in FIG. 1A. FIG. 1B is a schematic depiction of a geophone to explain principles discussed herein.

The geophone 10 of FIG. 1A includes a moving coil 12 mounted on a bobbin 17, a magnet 15, a pair of pole pieces 16 with suspension springs 20 and a housing 14. The pole pieces 16 and housing 14 are made of magnetically permeable material and form a magnetic field in which the moving coil 12 is suspended. In the example of FIG. 1A, the moving coil 12 mounted on the bobbin 17 and suspension springs 20 collectively form the effective moving mass portion m of the geophone.

In a conventional geophone, the moving coil 12 is suspended in a magnetic field by means of the pair of springs 20, as shown in FIG. 1A. The springs are designed to restrict radial movement of the coil and to provide a desired natural frequency for the mass-spring system in the axial direction. The moving coil tries to stay in the same position while the housing of the geophone is moved in response to external vibrations. In a conventional geophone of the type depicted in FIG. 1A, typically the springs are used to extract electrical signals from the geophone moving coil.

A geophone converts the ground motion to electrical signals. The motion of the moving coil 12 relative to the housing 14 (with a magnetic flux field) causes the coil to generate electrical signals that are proportional to the velocity of the moving coil.

In a geophone, the moving coil has, for example, two coils that are wound in opposite directions and are fixed on a bobbin so that the two coils move together in the magnetic field. Note again FIG. 1A. The two coils are in series in the moving coil, and their combined output generates signals that are proportional to the velocity of the moving coil. As described in further detail below, since the directions of the magnetic flux field for the upper coil and the lower coil are opposite, and the directions of the coil windings are opposite, both coils generate signals in the same direction.

FIG. 1C schematically depicts extraction of electrical signals from a conventional geophone shown in FIG. 1A. As shown in FIG. 1C, an electrical signal that is generated in the moving coil 12 of the geophone is extracted using the upper coil and the lower coil of the moving coil that are electrically connected in series in the moving mass assembly. The ends of the upper coil and the lower coil are electrically connected to the springs 20 on the moving mass. The springs 20 are further electrically connected to terminals 19 that are provided at the stationary end caps 18 (note again FIG. 1C).

FIG. 1D depicts windings of an upper coil and a lower coil of a geophone moving coil assembly and the directions of the magnetic flux field from a permanent magnet of the geophone seismic sensor. As shown in FIG. 1D, a permanent magnet is located at the center of the geophone. The upper pole piece redirects the magnetic flux from the magnet to the upper part of the housing which overlaps the upper coil of the moving coil. The magnetic flux from the housing comes back to the other side of the magnet through the lower pole piece, which overlaps the lower coil of the moving coil. The upper coil and the lower coil are wound on the same bobbin, but in opposite directions, and move simultaneously. When the moving coil assembly moves in a direction along the axis of the geophone, the upper coil generates $e_u = Blv$ and the lower coil generates $e_l = (-B)(-l)v$, where B is the flux density, l is the length of coil and v is the velocity of the moving coil. Since the direction of the magnetic flux to the upper coil is opposite of the direction of the magnetic flux to the lower coil, the upper coil and the lower coil of the moving coil generate the same electrical signals as long as the amount of the flux density and the length of the coil are the same.

As previously noted above, it is desirable in certain situations to determine displacement of the moving coil relative to the housing of the seismic sensor. In this, typically a displacement sensor that is located within a geophone seismic sensor requires an electric connection between the sensing element that is mounted on the moving mass and a terminal on the geophone. In prior devices there are two techniques for an electrical connection with a moving coil. First, using so-called pigtail connectors from the moving coil to terminals. However, such connectors are fragile and are not reliable, and are not used in current seismic sensors. Second, a pair of springs is commonly used for the electrical connection. However, if the displacement sensor is mounted on the moving mass, the pigtail connectors are the only available choice since the springs are already used to wire the moving coil.

The present disclosure proposes solutions to the above problems and shortcomings in prior seismic sensors having displacement sensing devices. The applicant recognized that displacement signals could be extracted from the moving mass by superimposing the displacement signals on velocity signals from the moving coil. As a result, the need for an additional connection is eliminated.

FIG. 2A depicts an exemplary capacitance displacement sensor circuit having common ground wiring of a capacitance signal and a moving coil signal. As shown in FIG. 2A, capacitance displacement sensors 34 are provided in a geophone type sensing device having reference signal generator 30, resistance 32 and operational amplifier 36. Applicant recognized that the common ground tends to pickup environmental electrical noise when the electronics are not located near the sensing device and the wiring is long, such as is typical for sensing devices that are used in seismic operations of the type described herein. In this, as shown in FIG. 2A, the capacitance sensor circuit diagram includes a common ground and the circuit for the moving coil of the seismic sensor is also in common ground. The moving plates of the capacitance 34 are combined to the ground of the moving coil. The reference signals are fed to the fixed plates. However, since the circuit is not balanced, the system, i.e., the sensor and the circuit, picks up electro-magnetic environmental noise, such as from a high line. Such a sensing device has to be packaged with electronics in a shielded housing, and can not be configured in the typical way that seismic sensor geophones are used with a long twisted pair cable on the ground without electronics.

FIG. 2B is a schematic depiction of one possible mechanism according to the present disclosure for extraction of capacitance displacement signals from a conventional geophone. The moving plates of the capacitance 34 are connected to the leads of the moving coil 12. Terminals 21 are provided for extraction of displacement signals from the sensing device.

FIG. 2C is a circuit diagram of one possible system for use in combination with the sensor mechanism of FIG. 2B for superimposition of capacitance displacement signals on velocity signals output from a geophone seismic sensor in accordance with the present disclosure. As shown in FIG. 2C, capacitance displacement sensors 34 are provided in a geophone type sensing device having the upper coil and the lower coil of a moving coil mounted on a bobbin 17, and reference signal generator 30, resistance 32, shunt resistance 32', buffer amplifier 36', and differential amplifier 36". The moving plates of the capacitance 34 are connected to the upper coil and the lower coil of the moving coil. A reference signal from the reference signal generator 30 is injected to the fixed plates of the capacitance 34. The same polarity signal is applied to both the upper capacitance and the lower capacitance. If the moving mass is at the upper side, the upper capacitance outputs larger signals than the lower capacitance. Signals from the upper and lower capacitances 34 are amplified with an instrument amplifier. In this example, the polarity of the signals from the lower coil of the moving coil is flipped so that the signal is large with reversed polarity when the moving mass is in a lower position. The output from the instrument amplifier is separated to the moving coil signal and the capacitance signal by means of filters, for example, low pass filters (LPF) and high pass filters (HPF). The capacitance signal is compared to the reference signal, and is rectified to output the displacement signal, as is done in differential transformer type displacement sensors.

FIG. 3A is a schematic depiction of a differential transformer type displacement sensor implemented in a conventional geophone seismic sensor to explain principles of the magnetic flux field generated by the stationary coils of the displacement sensor. As shown in FIG. 3A, the magnet is split into two parts and a center pole is inserted through the two parts of the magnet. Since the pole is in the center, there is no flux flow of the permanent magnet to the center yoke. A fixed or stationary coil is wound on each magnet part so that the two stationary coil windings have opposite directions. A reference high frequency signal is applied to the stationary coils. The stationary coils generate an electro-magnetic flux field that is created by the superimposition of a reference signal on the constant magnetic field of the permanent magnet. The frequency of the reference signal is outside the seismic frequency band of interest in the data acquisition so that there is no influence on the seismic measurements from the velocity signals of the moving coil. The two stationary coils generate high frequency magnetic flux fields in opposite directions. The two coils of the moving coil pick up the reference signal of the stationary coils in opposite phases. The high frequency magnetic flux penetrates the upper coil and the lower coil of the moving coil in the same direction (from inside to outside as depicted in the exemplary FIG. 3A), and is returned back to the coils from the center pole. Note FIG. 3A. Since the upper and the lower coil of the moving coil have windings in opposite directions, the high frequency signals that are output by the two coils have opposite polarities, as graphically shown in FIG. 3B.

FIG. 3B shows in graphs the signals output from an upper coil and a lower coil of a moving coil of the differential transformer displacement sensor shown in FIG. 3A and the sum of the two signal. As represented in FIG. 3B, when the moving coil is in a neutral position, i.e., at the center of the geophone housing, the two coil windings of the moving coil generate signals with the same amplitudes, but which are opposite in phase. The sum of the output of the two coil windings of the moving coil is zero. The sinusoidal signal shown above in the graph on the left is the output from the upper coil of the moving coil, the signal shown below in the graph on the left is the output from the lower coil of the moving coil, and the signal in the middle is the sum of the upper coil and lower coil signals.

However, when the moving coil is in the upper position (note again the upper graph on the right in FIG. 3B), the upper winding of the moving coil generates signals having larger amplitude than the signals that are generated by the lower winding of the moving coil. In this case, the sum of the output signals has reduced amplitude whereas the phase is the same as that from the upper winding of the moving coil. On the other hand, when the moving coil is in a lower position (note again the lower graph on the right in FIG. 3B), the lower winding generates signals having larger amplitude, and the sum of the signals is in the opposite phase. In this way, the differential transformer signal changes amplitude and polarity depending on where the moving coil is located relative to the magnetic flux field.

FIG. 3C shows one exemplary circuit diagram for acquiring displacement signals from a differential transformer displacement sensor, and the signal flow to output both velocity and displacement signals in accordance with the present disclosure. As shown in FIG. 3C, stationary coils of a differential transformer displacement sensor are provided in a geophone type sensing device having the upper coil and the lower coil of a moving coil mounted on a bobbin 17, and reference signal generator 30, resistance 32, and operational amplifier 36. The amplifier 36 amplifies both velocity signals due to motion of the moving coil and high frequency differential transformer signals. The low pass filter (LPF) filters out the differential transformer signals and outputs velocity signals from the moving coil of the sensing device. The circuit for polarity determination and signal rectification takes output signals after a high pass filter (HPF) and reference signals, from the reference signal generator 30 that are applied to the stationary coils, after the same HPF. The same HPF is applied to the reference signals so that differential transformer signals and reference signals have the same phase shift due to the HPF. The circuit compares the phase of the differential transformer outputs, and is designed to output displacement signals by rectifying the high frequency signals. The circuit outputs positive signals if the phase is the same as the reference signals and negative signals for the opposite phase.

FIG. 3D shows another embodiment of a geophone type sensing device with a differential transformer displacement sensor according to the present disclosure. In the exemplary embodiment of FIG. 3D, a center pole is not provided. In this, although by eliminating the center pole piece the strength of the electrical signals may be reduced, but the reference magnetic field is returned to the center of the two coils of the moving coil assembly. The permanent magnet may be more efficient if there is no center pole piece because the total height of the magnet is greater without the center pole piece. On the other hand, the use of a center pole piece may depend on the overall design of the geophone seismic sensor.

FIG. 3E shows yet another embodiment of a geophone type sensing device with a differential transformer displacement sensor according to the present disclosure. In the exemplary embodiment of FIG. 3E, stationary coils 22 are provided at the end caps 18 of the sensor housing 14. By locating the stationary coils 22 at the end caps 18, the polarities of the stationary flux are in the same direction so that the upper and lower coils of the moving coil 12 measure the flux in opposite polarity because of the opposite directions of their respective windings, and the summation of the signal is zero when the moving coil 12 is in the center position. In this, the flux density is maximum when the moving coil 12 is at the bottom of the housing 14 and at the top of the housing 14, but the polarities are opposite.

FIG. 3F shows yet another embodiment of a geophone type sensing device with a differential transformer displacement sensor according to the present disclosure. In the exemplary embodiment of FIG. 3F, a combination of stationary coils 22 is provided. Two additional stationary coils may be added to the stationary coils 22 in the end caps 18 of the sensor housing 14 so as to increase the change in the flux profile (the slope of the flux intensity relative to the position in the geophone axis x). In this way, the output voltage from the moving coil assembly is more sensitive to change in the position of the moving coil.

FIG. 4A is a schematic depiction of a geophone accelerometer (GAC) having a single coil. The cylindrical permanent magnet 15 is polarized outside to inside. The pole piece 16, end caps 18 and housing 14 are made of magnetically permeable material, such as soft steel. The magnetic flux from the magnet 15 crosses the moving coil 12, and is guided in the pole piece 16 in the upward and downward directions. The flux from the pole piece 16 is then guided in the end caps 18 and housing 14, and is returned to the magnet 15. The moving coil 12 generates electric signals that are proportional to magnetic flux density, length of the coil and the velocity of the moving coil.

FIG. 4B depicts schematically a GAC having a single coil with a differential transformer displacement sensor according to the present disclosure. In the embodiment depicted in FIG. 4B, the stationary coils 22 at the end caps 18 of the sensor housing 14 are applied to a single coil GAC. The directions of the flux are opposite so that the polarities of the signals are opposite when the moving coil 12 is in the upper position and the lower position relative to the sensor housing 14. The moving coil 12 picks up the reference signals from the stationary coils 22, and the summed signal is null when the moving coil 12 is in the center position relative to the sensor housing 14. If the moving coil 12 is in the upper position relative to the sensor housing 14, the moving coil 12 picks up more of the reference flux that penetrates the moving coil 12 from inside to outside than the reference signal flux from outside to inside. The situation is reversed when the moving coil 12 is in a lower position relative to the sensor housing 14. In this way, the differential transformer displacement sensor signal changes amplitude and polarity depending on where the moving coil is located relative to the magnetic field flux in the sensor housing 14.

FIG. 5A is a schematic depiction of a GAC having a dual moving coil. The pole piece 16 and the housing 14 are made of magnetically permeable material, such as soft steel. The upper cylindrical permanent magnet 15 is polarized outside to inside and the lower magnet 15 is polarized from inside to outside. The magnetic flux from the upper magnet crosses the upper coil of the moving coil 12, and is guided in the pole piece 16 in the downward direction. The flux from the pole piece 16 then crosses the lower coil of the moving coil 12 and reaches the lower magnet 15. The flux from the lower magnet 15 passes through the sensor housing 14 and is returned back to the upper magnet 15. The signals generated in the upper coil and the lower coil of the moving coil 12 due to the velocity of the coil have the same polarity, since the directions of the magnetic flux are opposite and the directions of the coil windings are opposite, and the summed signals (output of the combined signals) are increased.

FIGS. 5B and 5C depict schematically GACs having a dual coil with differential transformer displacement sensors according to the present disclosure.

In the exemplary embodiment of FIG. 5B, stationary coils 22 are provided at the end caps 18 of the sensor housing 14. In the exemplary embodiment of FIG. 5C, stationary coils 22 are provided between the upper coil and the lower coil of the moving coil 12.

As previously discussed above, the present disclosure proposes systems that overcome shortcomings in conventional geophones of the type described above. Aspects of the present disclosure teach how to configure a displacement sensor based, for example, on differential transformer technology, so as to superimpose the displacement signals on velocity signals of the moving coil such that the displacement sensor shares the same moving coil of the seismic sensor that is utilized to generate velocity signals. Consequently, additional electrical connection is not needed to the moving part of the seismic sensor.

As discussed in detail herein, stationary coils are provided that operate as a position sensor to monitor the displacement of the moving coil relative to the magnetic field in the housing of the seismic sensor. The present disclosure contemplates installing the displacement sensing element in a seismic sensor device to measure the displacement of the moving coil. In aspects of the present disclosure, the displacement sensor may output displacement signals in parallel to the moving coil. Since both signals are originated from the same moving mechanism, design and configuration of the seismic sensor are simplified.

FIG. 6A depicts one possible system for digital signal processing of displacement signals and velocity signals for output from a geophone seismic sensor in accordance with the present disclosure. In the system of FIG. 6A, the output signals from the upper coil and the lower coil of a moving coil mounted on a bobbin 17 are amplified, and are converted to digital data along with reference signals. As shown in FIG. 6A, the seismic sensing system includes reference signal generator 30, resistance 32, shunt resistance 32', buffer amplifier 36', differential amplifier 36", and multiplier 38 for obtaining signal phase. The digital signal processor (DSP) applies a low pass filter (LPF) to output the velocity data measured by the moving coil. The DSP also applies a high pass filter (HPF) to the moving coil data to extract high frequency displacement information. The same HPF is also applied to the reference signal data that drives the stationary coil. Note FIG. 6A.

An explanation is now provided of some embodiments wherein the DSP reconstructs the displacement of the moving coil of a seismic sensor from the extracted displacement signals. FIG. 6B shows in graphs synthetic data representing: 1) the reference signal to drive the stationary coil of the seismic sensor (in the top graph); 2) displacement of the moving coil of the seismic sensor in response to a seismic waveform (in the middle graph); and 3) the displacement signal that the moving coil captures based on the reference signal to the stationary coil (in the lower graph). The output from the moving coil is the summation of the displacement signal and the velocity signal that is proportional to the velocity of the moving coil in response to the seismic waveform (not shown here). The displacement signal is the same as the signals that are extracted by applying the high pass filtering to the output signals. As shown in FIG. 6B, the polarity of the displacement signal in the positive half sine of the displacement is the same as that of the reference signal. The polarity is reversed when the displacement is negative.

FIG. 6C shows using synthetic data the process of reconstruction of displacement from the measured displacement signals. The top trace is the product of displacement signal multiplied by the reference signals. When the displacement signal and reference signal are in phase, the product is always positive. When the signals are out of phase, the product is negative (as shown in FIG. 6C). The bottom trace is the result of low pass filtering of the product of displacement signal and reference signal shown that is in the top graph. As shown in the bottom graph, the displacement is reconstructed from the extracted displacement signals from the output of the moving coil.

By use of a DSP, it is possible to 1) utilize exactly the same filter for both the output data and the reference data; 2) eliminate temperature dependency of the filtered response; 3) use simple high order filters; and 4) easily convert the output signal to displacement data.

FIG. 6D depicts another possible system for digital signal processing of displacement signals and velocity signals for output from a geophone seismic sensor in accordance with the present disclosure. In the embodiment of FIG. 6D, it is possible for the DSP to generate the reference signal and, after digital to analog conversion, the reference signal is applied to the stationary coils of the differential transformer displacement sensor. In this case, the DSP already has the reference data, and the product of the displacement data and the reference data can be made with the internal reference data at the DSP.

The reference signal may also be applied to the stationary coils of the differential transformer displacement sensor via a shunt resistor, $R_s$, as shown in FIG. 6D. In this case, the signal that is actually applied to the stationary coils is monitored by digitizing the reference signal.

The system of FIG. 6D further provides for temperature compensation of the temperature dependency of the seismic sensing device. If the temperature of the sensor depicted in FIG. 6D rises, the resistance of the moving coil increases. By knowing the temperature coefficient of the moving coil, the temperature of the sensor can be monitored so as to compensate for variations in sensed data due to temperature. For example, the temperature data derived from the DSP can be used to compensate the velocity data and the displacement data. The temperature compensation may be done by using the same DSP with techniques that have been previously described in detail in the aforementioned commonly owned references incorporated herein by reference. For example, as previously described, sensor temperature determination may be done by monitoring the current injection for the reference signals into the stationary coil of the seismic sensor. Temperature of the stationary coil is derived which represents sensor temperature for purposes of compensating for temperature dependency of the seismic sensor.

FIG. 7 depicts one possible borehole tool 100 having a housing 102 with a plurality (three are depicted in FIG. 7) of seismic sensors 104 according to the principles of the present disclosure arranged in the borehole tool 100. An arm or locking mechanism 106 is provided to stabilize/lock the tool 100 after deployment in a borehole. Electrical circuitry 108 configured or designed according to the present disclosure provides the necessary functionality for the tool 100. The electronics associated with the borehole tool 100 include feedback circuits, analog-to-digital converter (ADC), circuitry to combine signals, digital signal processor (DSP), and telemetry circuits. The exemplary borehole tool depicted in FIG. 7 provides the functionality and operations that are discussed in the present disclosure for purposes of oilfield seismic survey operations. In this, other associated surface and downhole systems may be connected with the borehole tool 100 as desirable or necessary. Such associated components of an oilfield seismic survey system are not described in detail herein since they are known to those having ordinary skill in the art.

Generally, the techniques disclosed herein may be implemented on software and/or hardware. For example, they can be implemented in an operating system kernel, in a separate user process, in a library package bound into network applications, on a specially constructed machine, or on a network interface card. In one embodiment, the techniques disclosed herein may be implemented in software such as an operating system or in an application running on an operating system.

A software or software/hardware hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device.

FIG. 8 depicts in a flowchart one possible method for determining displacement of seismic signals sensed by a geophone seismic sensor using displacement signals that are superimposed on velocity signals output from the seismic sensor in accordance with the present disclosure. In the method of FIG. 8, one or more seismic sensor is deployed (200) for acquisition of seismic data. Electrical signals are provided to a displacement sensor of the seismic sensor (202) and seismic signals are detected (204). Displacement signals of the displacement sensor are superimposed on velocity signals from a moving coil of the seismic sensor (206) and velocity data and displacement data are output from the same moving coil of the seismic sensor (208). Displacement of seismic signals sensed by the seismic sensor is determined (210) for utilization as discussed in detail above.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A seismic sensor, comprising:
a housing;
at least one magnet mounted within the housing;
a moving coil mounted within the housing;
at least one spring assembly connected to the housing and the moving coil for supporting the moving coil for transduction within the housing; and
a stationary coil mounted within the housing so as to be stationary relative to the housing,
wherein the moving coil of the seismic sensor generates velocity signals based on a first magnetic flux field of the magnet and senses a second magnetic flux field of the stationary coil relative to a position of the moving coil.

2. A seismic sensor according to claim 1, wherein the first magnetic flux field of the magnet is a DC magnetic flux field.

3. A seismic sensor according to claim 1, wherein the second magnetic flux field of the stationary coil is an AC magnetic flux field.

4. A seismic sensor according to claim 1, further comprising a digital signal processor in communication with the seismic sensor and a set of instructions executable by the processor that, when executed, measure displacement of the moving coil relative to the housing so as to determine displacement of seismic signals detected by the seismic sensor.

5. A seismic sensor according to claim 1, wherein the seismic sensor is configured or designed for permanent or semi-permanent installation in seismic signal detection.

6. A seismic sensor according to claim 1, wherein the seismic sensor is configured or designed for long term deployment in high-temperature environments in excess of about 125 degrees Celsius.

7. A seismic sensor according to claim 1, wherein the seismic sensor is configured or designed for low frequency seismic signal detection.

8. A seismic sensor according to claim 7, wherein the seismic sensor is configured or designed for detecting seismic signals less than about 5 Hz.

9. A seismic sensor, comprising:
a housing;
at least one magnet mounted within the housing for creating a magnetic flux field;
a moving coil mounted within the housing;
at least one spring assembly connected to the housing and the moving coil for supporting the moving coil for transduction within the magnetic flux field; and
a displacement sensor within the housing for detecting displacement of the moving coil relative to the housing,
wherein the seismic sensor is configured or designed to output displacement signals of the displacement sensor superimposed on velocity signals generated by the moving coil based on the magnetic flux field of the magnet.

10. A seismic sensor according to claim 9, wherein the displacement sensor comprises a capacitance displacement sensor.

11. A seismic sensor according to claim 9, wherein the displacement sensor comprises a differential transformer displacement sensor.

12. A seismic sensor according to claim 9, further comprising a digital signal processor in communication with the seismic sensor and configured or designed to extract displacement signals of the displacement sensor and velocity signals of the moving coil from output signals of the seismic sensor.

13. A seismic sensor according to claim 12, further comprising a reference signal generator for generating a reference signal,
wherein the digital signal processor is further configured or designed to derive displacement of the moving coil from the displacement signals by multiplication of the reference signal and output signals of the displacement sensor.

14. A seismic sensor according to claim 9, further comprising a digital signal processor in communication with the seismic sensor and a reference signal generator for generating a reference signal to the displacement sensor,
wherein the digital signal processor is configured or designed to derive sensor temperature based on the reference signal to the displacement sensor.

15. A system for use in seismic signal detection, comprising:
at least one seismic sensor, comprising:
a housing;
at least one magnet for creating a first magnetic flux field mounted within the housing;
a moving coil within the housing structured and arranged so as to be fixed in a radial direction relative to the housing and movable in an axial direction thereof; and
a stationary coil within the housing structured and arranged to be stationary relative to the housing and spaced apart from the moving coil;
an electrical circuit configured or designed for providing an electrical signal to the stationary coil of the seismic sensor to create a second magnetic flux field within the housing,
wherein the moving coil of the seismic sensor generates velocity signals based on the first magnetic flux field of the magnet and senses the second magnetic flux field of the stationary coil relative to a position of the moving coil;
a digital signal processor in communication with the seismic sensor;
a set of instructions executable by the processor that, when executed:
measure displacement of the moving coil relative to the housing so as to determine displacement of seismic signals detected by the seismic sensor.

16. A system according to claim 15, wherein the electrical circuit is further configured or designed to provide a positive displacement feedback signal to an output of the seismic sensor.

17. A system according to claim 15, wherein the system is further configured or designed to provide an output signal comprising a combination of velocity and displacement signals output from the seismic sensor.

18. A method of seismic signal detection using at least one seismic sensor comprising a housing; at least one magnet mounted within the housing; a moving coil within the housing structured and arranged so as to be fixed in a radial direction relative to the housing and movable in an axial direction thereof; and a stationary coil mounted within the housing that is stationary relative to the housing, the method comprising:
deploying at least one seismic sensor at a location for seismic signal detection;
providing an electrical signal to the stationary coil of the seismic sensor;
detecting seismic signals with the at least one seismic sensor; and
outputting velocity and displacement signals from the seismic sensor based on the sensed seismic signals and the electrical signal to the stationary coil of the seismic sensor,
wherein the moving coil of the seismic sensor generates velocity signals based on a first magnetic flux field of the magnet and senses a second magnetic flux field of the stationary coil relative to a position of the moving coil.

19. A method of seismic signal detection according to claim 18, further comprising a digital signal processor and a set of instructions executable by the processor that, when executed, measure the displacement of the moving coil relative to the housing so as to determine displacement of the seismic signals sensed by the seismic sensor.

20. A method of seismic signal detection using at least one seismic sensor comprising a housing; at least one magnet mounted within the housing for creating a magnetic flux field; a moving coil mounted within the housing; at least one spring assembly connected to the housing and the moving coil for supporting the moving coil for transduction within the magnetic flux field; and a displacement sensor within the housing for detecting displacement of the moving coil relative to the housing, the method comprising:
deploying at least one seismic sensor at a location for seismic signal detection;
detecting seismic signals with the at least one seismic sensor; and
outputting velocity and displacement signals from the seismic sensor based on the detected seismic signals,
wherein the seismic sensor is configured or designed to output displacement signals of the displacement sensor superimposed on velocity signals generated by the moving coil.

* * * * *